US012766075B2

(12) United States Patent
Niitsuma et al.

(10) Patent No.: US 12,766,075 B2
(45) Date of Patent: Oct. 20, 2026

(54) MEDICATION ASSISTANCE DEVICE

(71) Applicants: Youhei Niitsuma, Kanagawa (JP); Hirotaka Hayashi, Aichi (JP); Terumitsu Azuma, Gifu (JP); Yu Yamaya, Gifu (JP); Yoshihide Sugiyama, Gifu (JP); Hiroshi Fujie, Aichi (JP); Manabu Yamanaka, Aichi (JP); Akira Kojima, Kanagawa (JP); Takato Mochizuki, Kanagawa (JP)

(72) Inventors: Youhei Niitsuma, Kanagawa (JP); Hirotaka Hayashi, Aichi (JP); Terumitsu Azuma, Gifu (JP); Yu Yamaya, Gifu (JP); Yoshihide Sugiyama, Gifu (JP); Hiroshi Fujie, Aichi (JP); Manabu Yamanaka, Aichi (JP); Akira Kojima, Kanagawa (JP); Takato Mochizuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 133 days.

(21) Appl. No.: 18/667,361

(22) Filed: May 17, 2024

(65) Prior Publication Data

US 2024/0398668 A1 Dec. 5, 2024

(30) Foreign Application Priority Data

May 29, 2023 (JP) ................................ 2023-087686

(51) Int. Cl.
*A61J 7/04* (2006.01)
*A61J 7/00* (2006.01)

(52) U.S. Cl.
CPC .......... *A61J 7/0427* (2015.05); *A61J 7/0084* (2013.01); *A61J 7/0454* (2015.05)

(58) Field of Classification Search
CPC ........ A61J 1/035; A61J 7/0427; A61J 7/0454; A61J 7/0084; A61J 7/0069; A61J 2200/70;
(Continued)

(56) References Cited

U.S. PATENT DOCUMENTS 5,468,110 A * 11/1995 McDonald .......... G07F 17/0092 414/268
2010/0176164 A1* 7/2010 May ...................... A45C 11/00 224/191
(Continued)

FOREIGN PATENT DOCUMENTS

JP 2017093708 A 6/2017
JP 6462947 B1 1/2019
(Continued)

*Primary Examiner* — Leslie A Nicholson, III
(74) *Attorney, Agent, or Firm* — Harness, Dickey & Pierce, P.L.C.

(57) ABSTRACT

A medication assistance device includes a storing member, medicine dispenser, discharge/transport mechanism, pack information reader, pack information management system (PIMS), storing detector, and controller. The storing member stores medicine packs. The medicine dispenser arranges a medicine pack in a position. The discharge/transport mechanism discharges the medicine pack from the storing member to transport to a position of the medicine dispenser. The pack information reader in the discharge/transport mechanism reads medication associated information (MAI) attached to the storing member and/or medicine pack. The PIMS manages the MAI of the medicine pack. The storing detector detects attachment or detachment of the storing member to a device main body. The controller informs the PIMS and causes the pack information reader to read the MAI of the storing member based on a detection signal from the storing detector when the storing member is mounted in the device main body.

20 Claims, 34 Drawing Sheets

(58) Field of Classification Search
CPC .............. A61J 2205/10; G07F 11/1657; G07F 17/0092; G16H 20/10; G16H 20/13
USPC ........................................................... 221/13
See application file for complete search history.

(56) References Cited

U.S. PATENT DOCUMENTS

| | | | | |
|---|---|---|---|---|
| 2019/0102965 | A1* | 4/2019 | Greyshock .............. | G07F 11/60 |
| 2020/0098462 | A1 | 3/2020 | Takashima et al. | |
| 2021/0361532 | A1 | 11/2021 | Hayashi et al. | |
| 2022/0233406 | A1 | 7/2022 | Kojima et al. | |
| 2022/0270734 | A1* | 8/2022 | Misra ..................... | G16H 10/60 |
| 2023/0096511 | A1 | 3/2023 | Morinaga et al. | |
| 2023/0255853 | A1 | 8/2023 | Fujie et al. | |
| 2023/0255854 | A1 | 8/2023 | Hayashi et al. | |
| 2023/0293391 | A1 | 9/2023 | Yamanaka et al. | |
| 2023/0372203 | A1 | 11/2023 | Niitsuma et al. | |
| 2023/0404855 | A1 | 12/2023 | Yamaya et al. | |

FOREIGN PATENT DOCUMENTS

| | | | |
|---|---|---|---|
| JP | 6900474 | B2 | 7/2021 |
| JP | 6924638 | B2 | 8/2021 |
| JP | 2021185976 | A | 12/2021 |

* cited by examiner

MEDICATION ASSISTANCE DEVICE

CROSS-REFERENCE TO RELATED APPLICATION

The present application claims priority under 35 U.S.C. § 119 to Japanese Patent Application No. 2023-087686, filed May 29, 2023, the contents of which are incorporated herein by reference in their entirety.

BACKGROUND OF THE INVENTION

1. Field of the Invention

The disclosures herein generally relate to medication assistance devices.

2. Description of the Related Art

As technologies associated with medication assistance devices, a technology of a medication assistance device, which is used by an individual taking medication or a caregiver of the individual and automatically dispenses medicines to a predetermined medication management case is known. In the medication management case, medicines are divided in advance and set in a storing member for each administration (see, for example, Japanese Unexamined Patent Application Publication No. 2017-93708).

The invention disclosed in Japanese Unexamined Patent Application Publication No. 2017-93708 can automatically dispense medicines, but cannot determine whether or not a replacement of the storing member has been performed, and nor updating information of only necessary positions.

SUMMARY OF THE INVENTION

In one embodiment, a medication assistance device includes a storing member, a medicine dispenser, a discharge and transport mechanism, a pack information reader, a pack information management system, a storing detector, and a controller. The storing member is configured to store medicine packs. The medicine dispenser is configured to arrange a predetermined medicine pack among the medicine packs in a predetermined position. The discharge and transport mechanism is configured to discharge the predetermined medicine pack from the storing member to transport to a predetermined position of the medicine dispenser. The pack information reader is disposed in the discharge and transport mechanism and is configured to read medication associated information attached to at least one of the storing member or the medicine pack where the medication associated information includes a name of an individual taking medication and administration timing. The pack information management system is configured to manage the medication associated information of the medicine pack. The storing detector is configured to detect attachment or detachment of the storing member to a device main body. The controller is configured to inform the pack information management system and cause the pack information reader to read the medication associated information of the storing member to be updated based on a detection signal from the storing detector at a time when the storing member is mounted in the device main body.

BRIEF DESCRIPTION OF THE DRAWINGS

FIGS. 18A-2 and 18B-2 are views illustrating an example of the cartridge tray on which the cartridge is set;

DESCRIPTION OF THE PREFERRED EMBODIMENTS

Figure 1A:
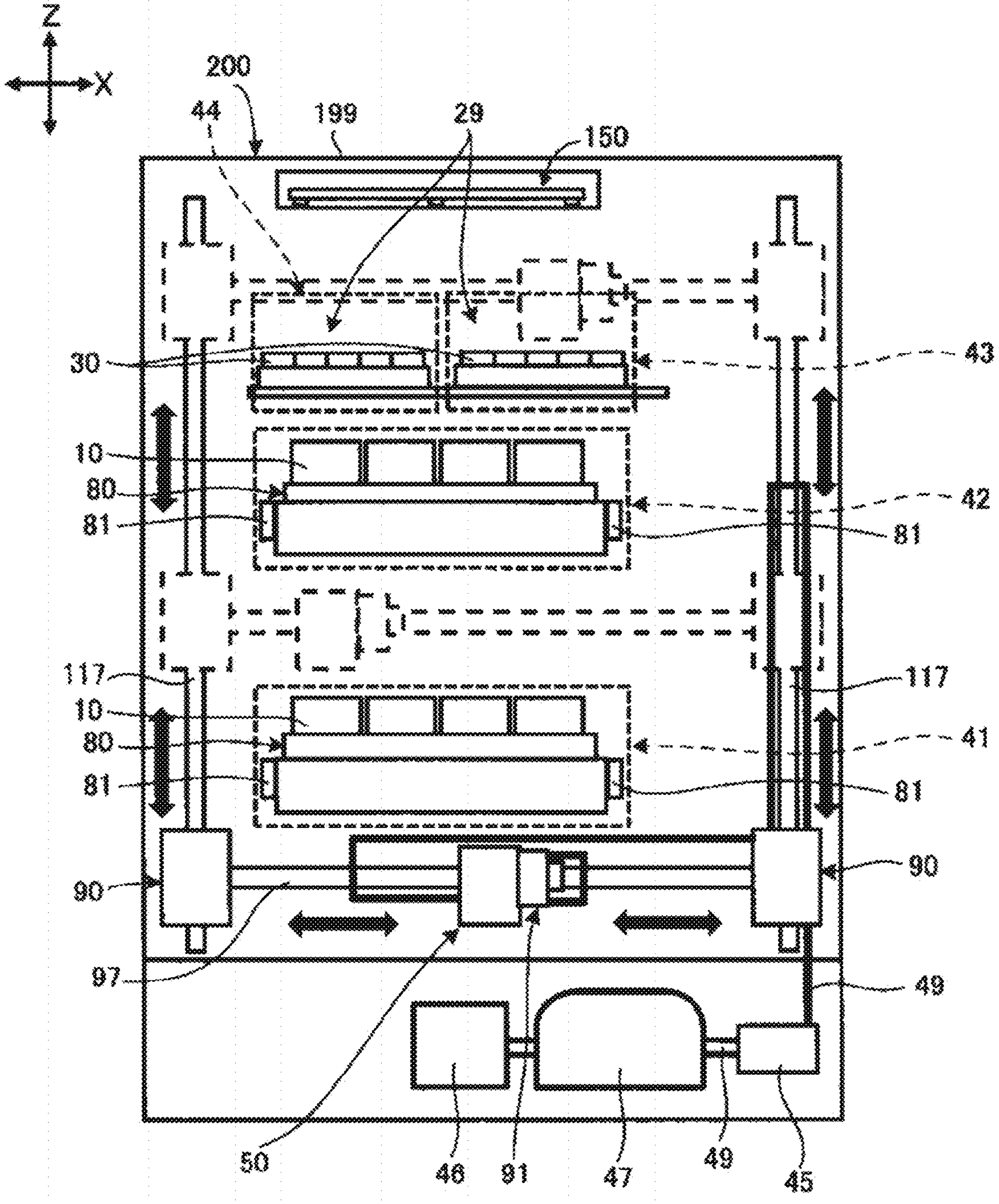
FIG. 1A is a front view illustrating an example of a main part of a medicine dispenser included in a medication assistance device of the present disclosure.

According to one aspect, the present disclosure aims to provide a medication assistance device which can achieve an efficient medicine dispensing operation while maintaining safety with a minimum check through detection of insertion or removal of a storing member and update of information related to only positions where there are changes.

In the following, aspects of the present disclosure, which includes embodiments of the present disclosure, will be described with reference to the accompanying drawings. The same reference numerals are given to components (devices, mechanisms, members, etc.) having the same functions and shapes throughout the embodiments unless confusions may be potentially caused, and the redundant description of the same components will be omitted.

Further, the present invention is not limited to these embodiments, but various variations and modifications may be made without departing from the scope of the present invention.

Figure 1B:
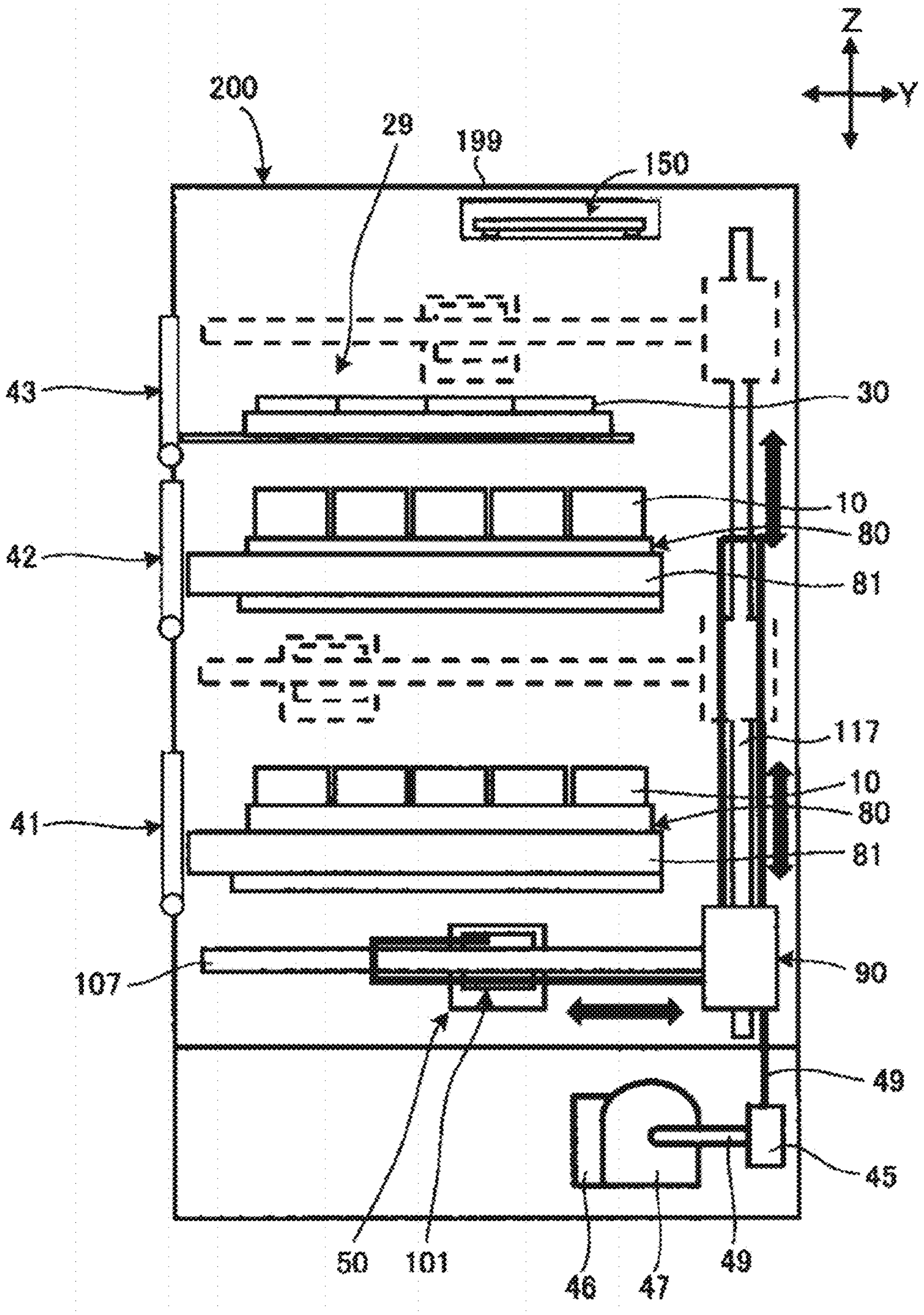
FIG. 1B is a side view of FIG. 1A.

A configuration of a main part of a medicine dispenser included in a medication assistance device according to an embodiment of the present disclosure will be described with reference to FIGS. 1A and 1B. FIG. 1A is a schematic front view illustrating an example of the configuration of the main part of the medicine dispenser. FIG. 1B is a schematic side view illustrating a side configuration of FIG. 1A.

As illustrated in FIGS. 1A and 1B, the main part of the medicine dispenser 200 includes a cartridge 10, which is also referred to as a first storing member, a cartridge tray 20, which is also referred to as a second storing member, a drawer 80, a medicine dispensing tray 30, a carriage 50, which is also referred to as a discharging mechanism, a transporting device 90, and a first access opening 41 to fourth access opening 44.

In FIGS. 1A and 1B, a left-right direction or lateral direction (also a width direction) of the medicine dispenser 200 is determined as an X direction, a front-back direction or depth direction of the medicine dispenser 200 is determined as a Y direction, and an up-down direction or a longitudinal direction (also a vertical direction) is determined as a Z direction, and the orientations of the directions are the same in the subsequent drawings.

The cartridge 10 functions as a first storing member of the present disclosure that is configured to store medical packs in a stacked state. As will be described below, the medical packs include unit-dose medicine packs (may be simply referred to as "packs" hereinafter) in each of which one or more medicines are packaged as a single unit, and a unit-dose medicine pack bundle (described below). A plurality of cartridges 10 are disposed via cartridge trays 20 in a middle stage and a lower stage of a main body frame 199 serving as a device main body of the medicine dispenser 200. Each cartridge is configured to be detachably attached to the cartridge tray 20 serving as a second storing member. In the present specification, "stored in a stacked state" means that packs are stored in a state where the packs are substantially horizontally arranged or stacked flat.

As will be described below, the cartridge tray 20 is configured to store the cartridges 10 in designated positions. The cartridge tray 20 has a function as the second storing member that allows at least one cartridge 10 to be placed and retained.

The cartridges 10 are arranged on a drawer 80 disposed in a lower portion and a drawer 80 disposed in a center portion of the main body frame 199 serving as a device main body of the medicine dispenser 200 via the cartridge trays 20. In the example of FIGS. 1A and 1B, twenty cartridges 10 (4×5=20) are placed and retained in one drawer 80 (cartridge tray 20) (see FIG. 7 described below). For the sake of simplicity, the drawer 80 may be referred to as the cartridge tray 20 hereinafter.

Each of the cartridges 10 is placed and stored in a corresponding section of the cartridge tray 20 partitioned off by lattice side walls and a bottom wall. Rectangular openings 21 (see FIG. 7 described below) are formed in sections of the bottom wall of the cartridge tray 20 corresponding to the cartridges 10 so that each pack can be taken out from the bottom of the cartridge 10 using the elastic or freely deformable nature of the pack as described in the operation below.

The drawer 80 is configured to position and retain the cartridge tray 20. A pair of slide rails 81 are attached to the outer side walls of the drawer 80, and main body rails (not illustrated) are disposed on the main body frame 199 so that the main body rails are engaged with the slide rails 81 of the drawer 80. The engagement between the main body rails and the slide rails 81 allows the drawer 80 in which the cartridge tray 20 is stored and retained to be pulled out from the main body frame 199.

The medicine dispensing tray 30 functions as a medicine dispenser of the present disclosure or a medicine dispensing table, on which predetermined packs transported by the transporting device 90 are arranged. As illustrated in FIGS. 1A and 1B, two medicine dispensing trays 30 are arranged above the cartridges 10 mounted on the cartridge tray 20 on the uppermost drawer 80. The position at which the medicine dispensing tray 30 is disposed (location where packs are delivered to the medicine dispensing tray 30 to enable automatic medicine dispensing) is referred to as a medicine dispensing site 29.

The carriage 50 is a discharging mechanism configured to discharge a predetermined pack from the cartridge 10, and has a function as a discharger of the present disclosure.

The transporting device 90 functions as the transporting mechanism of the present disclosure configured to transport the pack taken out from the cartridge 10 of the carriage 50.

The discharger (carriage 50) and the transporting mechanism (transporting device 90) function as a discharge and transport mechanism of the present disclosure configure to take a predetermined medicine pack out from the storing member (cartridge 10) and transport to a predetermined position in the medicine dispenser (medicine dispensing tray 30).

The first access opening 41 and the second access opening 42 each function as an access opening for a storing member, through which the cartridge 10 or the cartridge tray 20 is inserted into or removed from the main body frame 199 via the drawer 80. When cartridges 10 are inserted into and set in the main body frame 199, the cartridges 10 are inserted from the first access opening 41 and the second access opening 42, respectively. A door of the first access opening 41 and a door of the second access opening 42, which can be open and closed, are each open to pull out the drawer 80 on which the cartridge tray 20 is set, and the cartridge 10 or the cartridge tray 20 is detached or attached.

The third access opening 43 and fourth access opening 44 function as access openings for medicine dispensing, through which the two medicine dispensing trays 30 aligned in the uppermost stage of the medicine dispenser 200 are taken out from or inserted into the main body frame 199. The third access opening 43 and the fourth access opening 44 are disposed so that the packs can be taken out immediately after the packs are disposed (may be referred to as "set" or "inserted" hereinafter) in the medicine dispensing tray 30.

As described above, two medicine dispensing tray 30 are disposed in the medicine dispenser 200. As will be described below, a medicine dispensing tray is provided for each administration timing, such as morning, noon, evening, or before bedtime. The third access opening 43 and fourth access opening 44 for the medicine dispensing trays are also provided respectively for the medicine dispensing trays, thus one of the medicine dispensing trays can be taken out while a medicine dispensing operation is carried out on the other medicine dispensing tray.

The cartridge trays 20 illustrated in FIGS. 1A and 1B are arranged in a manner such that the two cartridge trays 20 are aligned in two stages (upper stage and lower stage) below the medicine dispensing tray 30 disposed in the uppermost stage, but the arrangement of the cartridge trays 20 is not limited to the illustrated example. The cartridge trays 20 may be collectively arranged at the upper side or at the lower side. Further, depending on the number of residents in a care facility, the cartridge trays 20 may be arranged in three stages to achieve the same effect.

Figure 2A:
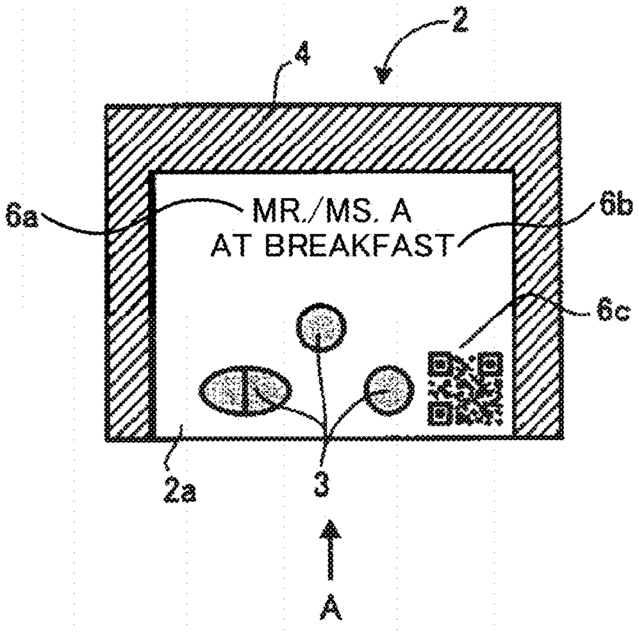
FIG. 2A is a plan view illustrating an example of a single unit-dose medicine pack.
Figure 2B:
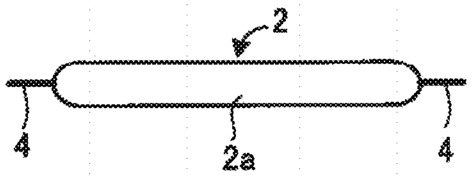
FIG. 2B is a side view of the unit-dose medicine pack of FIG. 2A as viewed in an A arrow direction.
Figure 2C:
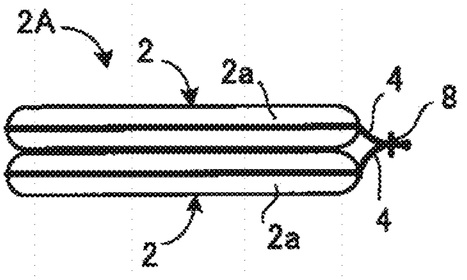
FIG. 2C is a side view illustrating an example of a unit-dose medicine pack bundle.
Figure 2D:
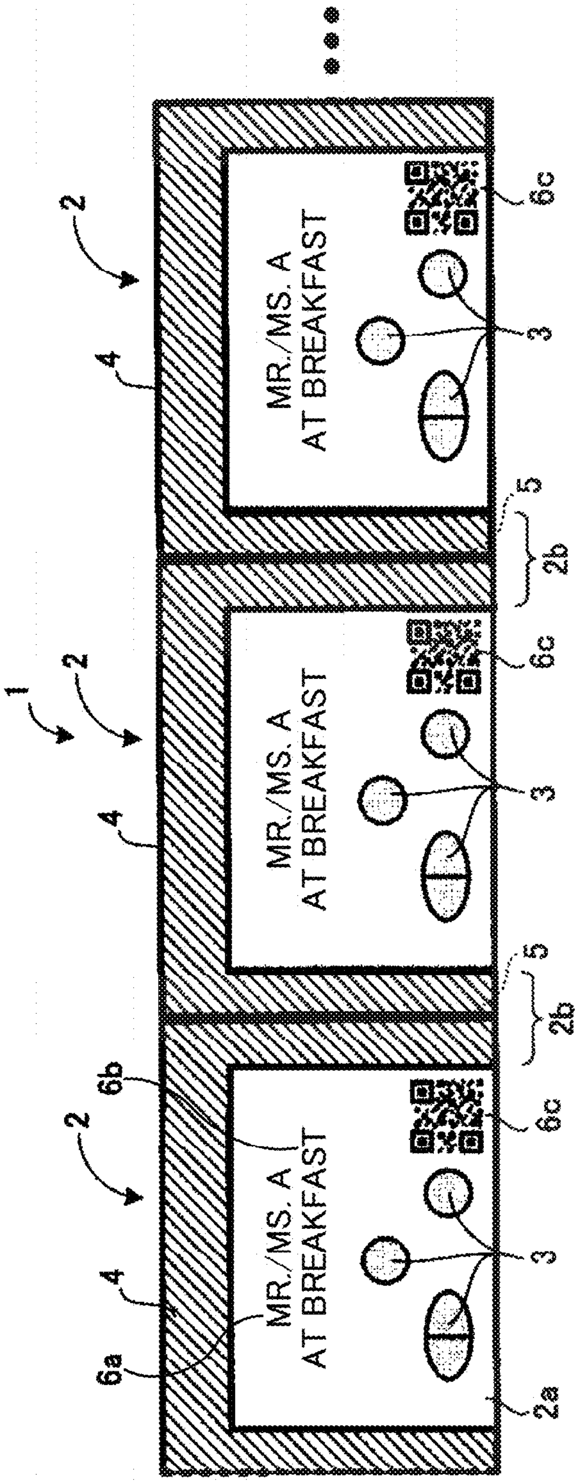
FIG. 2D is a view illustrating an example of a typical embodiment of a pack strip.

An outline of the medicine packs associated with the present disclosure will be described with reference to FIGS. 2A to 2D. FIG. 2A is a plan view illustrating an example of a general configuration of a single unit-dose medicine pack. FIG. 2B is a side view as viewing the unit-dose medicine pack of FIG. 2A in the arrow A direction. FIG. 2C is a side view illustrating an example of a unit-dose medicine pack bundle in which unit-dose medicine packs are stacked. FIG. 2D is a view illustrating an example of a general configuration of a pack strip. FIGS. 2B and 2C are schematic views from which illustration of medicines is omitted.

Embodiments of the medicine pack of the present disclosure include a single unit-dose medicine pack 2, and a unit-dose medicine pack bundle 2A (may be simply referred to as a "pack bundle" hereinafter) in which a plurality of unit-dose medicine packs 2 (two in FIG. 2C) are stacked in a stacking direction and joined together, for example, by stapling. In FIGS. 2A to 2D, the pack 2 is mainly illustrated as an example, but it is needless to say that the pack bundle 2A is also included as the medicine pack in the present disclosure.

As illustrated in FIG. 2A, the single unit-dose medicine pack 2 is formed of, for example, a resin film, and medicines 3, such as capsules and tablets are divided and packaged in the single unit-dose medicine pack 2. The unit-dose medicine pack 2 includes a pouch portion 2*a* covering medicines 3, and a pressure-bonded portion 4 where three sides of the pack indicated by hatching are pressure-bonded or fused. One of the sides of the pack constituting the pouch portion 2*a* is typically forming by folding the film into two and the medicines 3 are inserted into the space between the folded film, and the pressure-bonded portion 4 constitutes a spill-prevention portion that prevents the medicines 3 from spilling out from the pouch portion 2*a*. The medicines 3 in the single unit-dose medicine pack 2 are typically medicines of a single medication unit (single dose) per one administration for an individual taking medication.

The unit-dose medicine packs 2 are prepared (packaged) by a medicine packaging machine installed in a pharmacy, etc. Packaging paper (packaging sheet) used for packaging and constituting an exterior portion of a pack is a rolled long sheet, and is rolled in a state in which the sheet is folded and the folded portion is overlapped. The medicines 3 are inserted into a space between the folded sheet. The three sides surrounding the medicines 3 other than the folded portion are sequentially sealed and divided by the pressure-bonded portions 4 to form a continuous sheet of unit-dose medicine packs 2 for predetermined administration doses. The continuous sheet of the unit-dose medicine packs is referred to as a "pack strip." The pack strip 1 illustrated in FIG. 2D is composed of a plurality of unit-dose medicine packs 2 (for three administration doses in the illustrated example) that are continued as a strip. The pack strip 1 is a typical configuration that is generally sold and provided in a pharmacy, etc., to a user (an individual actually taking medicines packaged in a unit-dose medicine pack, or a caregiver who is caring or assisting administration of the medicines, or staff members (including pharmacists, nurses, caregivers, and medication supporters) of various care facilities or medical facilities. For the sake of simplicity of description, an identical form (e.g., capsule and tablets) of medicines is encapsulated in each pack will be illustrated, but it is needless to say that different forms of medicines may be encapsulated in each pack according to the intended use and purpose of a user.

In the example illustrated in FIGS. 2A to 2D, the unit-dose medicine pack 2 has a rectangular shape in a planar view. A packaging system where three sides are pressure-bonded as in the illustrated example is typically called a three side seal pouch packaging, and most of medicines packaging machines on the market produce packs in three side seal system.

The pressure-bonded portion 4 has a band-shaped width of approximately 10 mm to approximately 15 mm, and has a higher rigidity than the pouch portion 2*a* formed of a transparent or translucent film through which the medicines 3 are visually recognized. In the process of production (packaging) performed by the medicine packaging machine, a boundary 2*b* provided with a perforation 5 is formed along a center of the pressure-bonded portion 4 between adjacent unit-dose medicine packs 2 constituting the pack strip 1, which are continued to and next to one another from the upstream side to the downstream side. A user who has no problem using his or her hands can acquire a single unit-dose medicine pack 2 by tearing the pack 2 off by hand at the perforation 5, or cutting the pressure-bonded portion 4 along the perforation 5 using scissors or a dedicated cutter.

As one example is illustrated in FIG. 2C, a pack bundle 2A may be used. Examples of the pack bundle 2A include a bundle in which a plurality of unit-dose medicine packs 2 (two in FIG. 2C) are joined together by stapling 8 (see FIG. 2C) the center portions (middle sides) of the pressure-bonded portions 4 of the unit-dose medicine packs among the three sides of the pressure-bonded portions of the unit-dose medicine packs 2, a bundle in which a plurality of unit-dose medicine packs 2 are bonded together by taping, and a bundle in which Chinese medicine packs or press through packages (PTP) are joined together.

First medication associated information (may be simply referred to as "medication associated information" hereinafter) is attached to a surface of the pouch portion 2*a* of the unit-dose medicine pack 2. The first medication associated information is information associated medication including a name of an individual taking medication and administration timing (also referred to as medication timing). To the pack 2 illustrated in FIG. 2A, as the medication associated information, medication associated information 6*a* including an array of letters indicating a name of an individual taking medicines 3 of the pack 2, medication associated information 6*b* including an array of letters indicating administration timing of the medicines 3 (medication timing), and medication associated information 6*c* including a QR code (registered trademark) indicating the name of the individual and the administration timing are attached.

To the pack 2 illustrated in FIG. 2A, the medication associated information 6*a* and 6*b* represented by the arrays of letters, and the medication associated information 6*c* represented by the QR code (registered trademark) are attached. However, the medication associated information is not limited to the illustrated example, and the medication associated information may be attached as a barcode or a RFID tag that is used when tagged information is read via near field communication.

Moreover, the medication associated information may further include a type of medicines (including shapes of medicines) and the number of medicines (capsules or tablets) prescribed in each pack, and information engraved in medicines themselves. As the medication associated information, individual information may be acquired and used, or a few pieces of information may be acquired and used in combination. When only a name of an individual taking medication is confirmed, for example, only information of a name of an individual taking medication is used. When adherence of medication of a crucial medicine is to be monitored, information of a name of an individual taking medication and information of the number of medicines or shapes of medicines in each pack may be confirmed together. Specifically, the medication associated information includes at least one information selected from the group consisting of a name of an individual taking medication, administration timing of medicines in each pack (medication timing), and types and the number of medicines prescribed in each pack.

Figure 3:
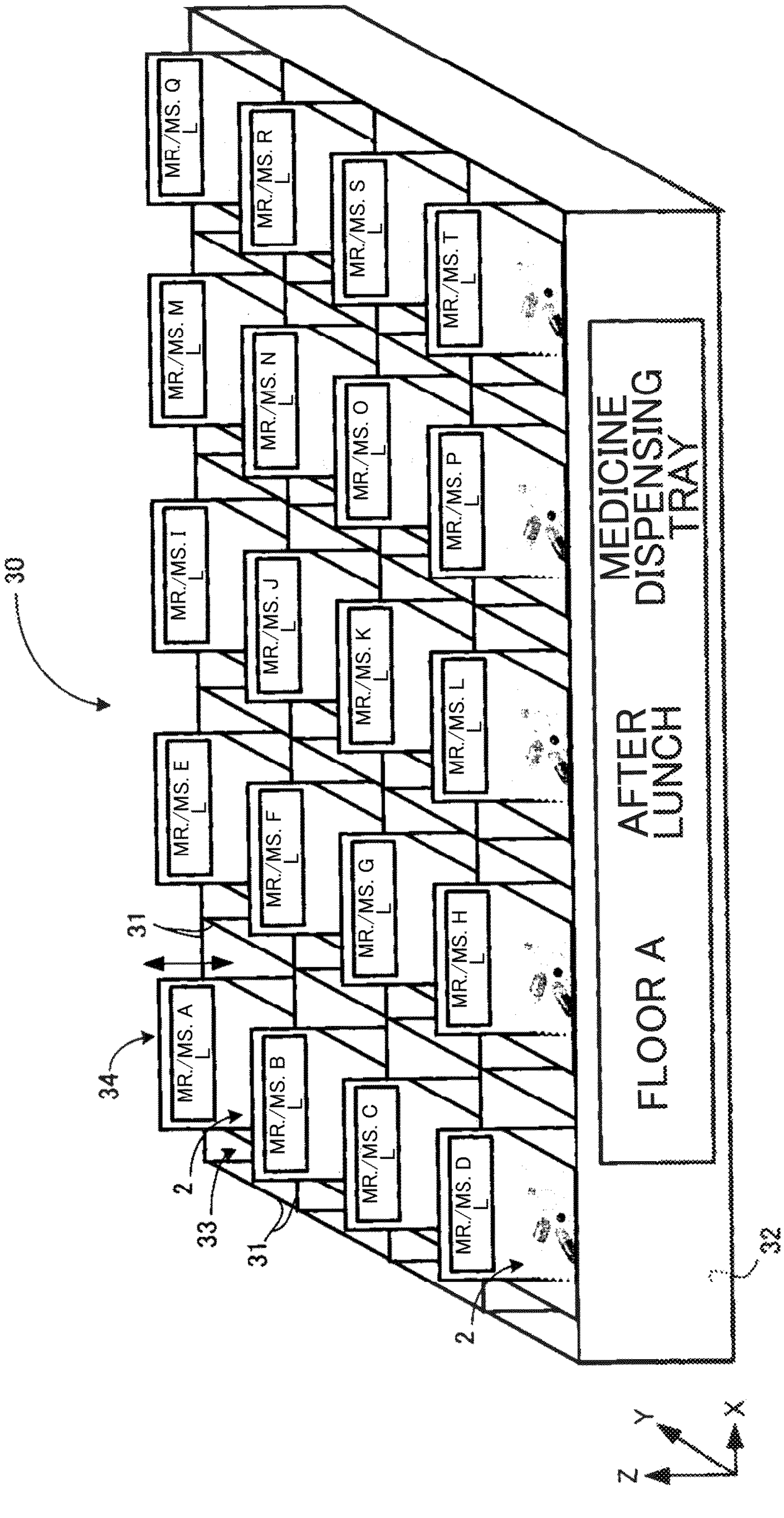
FIG. 3 is a schematic perspective external view illustrating one example of a configuration of a medicine dispensing tray.

The medicine dispensing tray will be describe with reference to FIG. 3. FIG. 3 is a schematic external perspective view illustrating one configuration example of the medicine dispensing tray. As illustrated in FIG. 3, the medicine dispensing tray 30 includes partition walls 31 that are partitioning members serving as a plurality of dividers for arranging predetermined packs. The sections of the medicine dispensing tray 30 are each divided by four standing partition walls 31. Twenty sections 33 formed in the medicine dispensing tray 30 are represented as components of a matrix composed of 5 columns in an X direction (line-feeding direction) and 4 rows in a Y direction (letter-feeding direction). Thus, the 20 sections 33 of the medicine dispensing tray 30 can be specifically positioned by the components and addresses of the matrix of 5 columns and 4 rows. The medicine dispensing tray 30 further includes a bottom wall 32 on which the arranged packs 2 are placed. As described above, the medicine dispensing tray 30 is configured to securely provide the predetermined sections 33 each partitioned off by a plurality of (four) partition walls 31 and the common bottom wall 32 so that a certain pack (not illustrated) arranged in a certain section 33 will not mix with packs (not illustrated) in another section 33, or will not drop from the bottom wall 32.

In the medicine dispensing tray 30 illustrated in FIG. 3, "Floor A After Lunch Medicine Dispensing Tray" depicted on the external front wall surface indicates, for example, that the medicine dispensing tray 30 is a medicine dispensing tray in which packs for a plurality of people staying on the same floor A in a care facility etc., to administer after lunch (also at breakfast of the medication associated information 6*a* and 6*b* of the packs 2 in illustrated in FIGS. 2A to 2D).

The medicine dispensing tray 30 of FIG. 3 illustrates an example where a detachable compartment box 34 is used inside each section 33. The compartment boxes 34 are configured to retain the packs 2 in which medicines for 20 residents of a care facility, including Mr./Ms. A to Mr./Ms. T, to take after lunch (abbreviated as "L" in FIG. 3). Specifically, the medicine dispensing tray 30 illustrated in FIG. 3 is used when a predetermined pack is arranged in a predetermined (specific) section 33 partitioned off by a plurality of dividers via the compartment box 34. The operation of arranging the pack 2 to the medicine dispensing tray 30 may not use the compartment box 34.

Figure 4A:
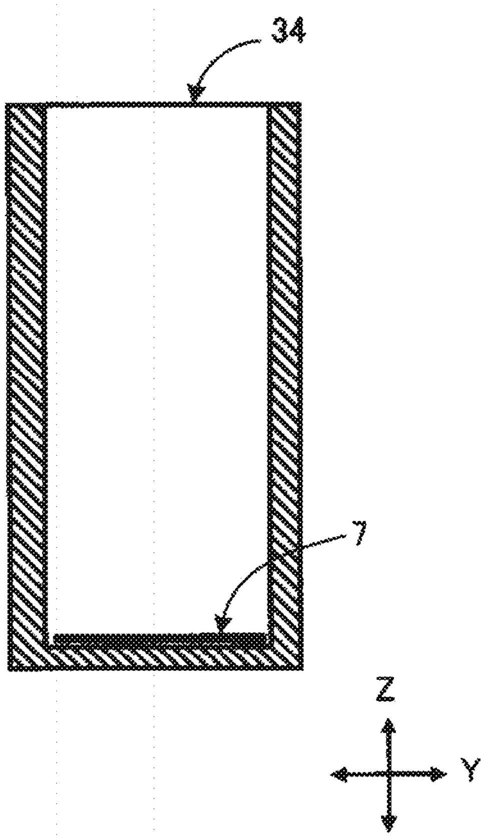
FIG. 4A is a view illustrating an installation example of a label with a QR code (registered trademark) arranged inside a compartment box.
Figure 4B:
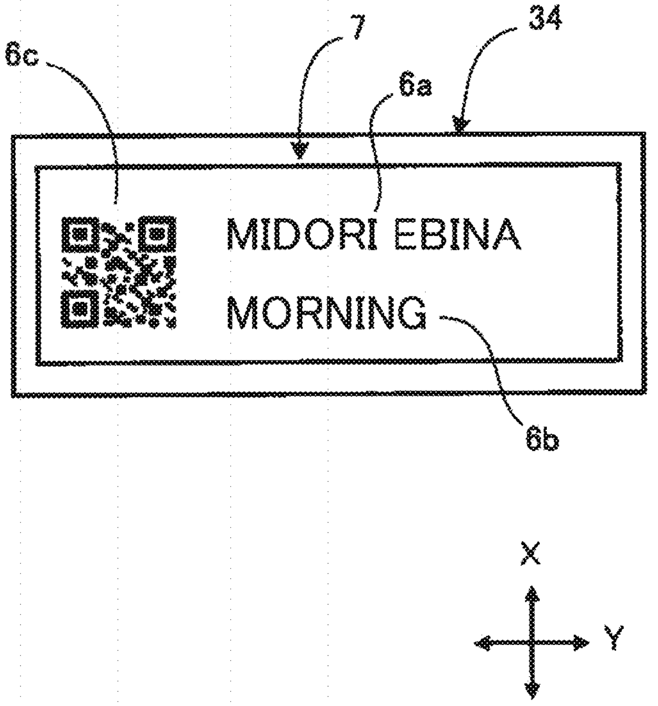
FIG. 4B is a view illustrating a display example of the label with the QR code (registered trademark)

One example of a label with a QR code (registered trademark) arranged in the compartment box used in the medicine dispensing tray will be described with reference to FIGS. 4A and 4B. FIG. 4A is a view illustrating an installation example of the label with a QR code (registered trademark) arranged in a compartment box used in the medicine dispensing tray. FIG. 4B is a view illustrating a display example of the label with the QR code (registered trademark). In order to designate the medicine dispensing position of the pack 2 taken out from the cartridge 10, a QA code-attached label 7, on which medication associated information 6*a* indicating a name of an individual taking medication, medication associated information 6*b* indicating administration timing, and medication associated information 6*c* displaying the medication associated information 6*a* and 6*b* with a QR code (registered trademark) are printed, is attached and arranged by adhering the label 7 to the bottom surface inside the compartment box 34 of the medicine dispensing tray 30.

The QR code (registered trademark) on the QA code-attached label 7 is read by a lower QR code reader 67 described in FIGS. 9A and 9B below, coordinates of the X position and Y position, which are the positional information of the carriage 50 are linked with the QR code (registered trademark) (a name of an individual taking medication and administration timing) so that the pack taken out from the cartridge can be dispensed in an appropriate position. The QA code-attached label 7 may be in a form of a sticker to adhere directly to the compartment box 34, or may be attached to a plate (not illustrated), which may be then arranged in the compartment box 34.

The QR code label may be adhered to each of the sections 33 of the medicine dispensing tray 30, or the plate (not illustrated) may be arranged in each of the sections 33 of the medicine dispensing tray 30 (when the compartment boxes 34 are not used). Since the compartment box 34 is used, the compartment box 34 in which the pack 2 is stored is taken out from the medicine dispensing tray 30, and the appropriate pack 2 is moved to the position under the name of the resident (the person taking medication) so that erroneous mixed-up of packs or dropping of packs can be avoided.

In the sections 33 of the medicine dispensing tray 30, setting or an insertion position of the pack to be administered is determined for each individual taking medication. Specifically, a plurality of sections 33 in the medicine dispensing tray 30 may be allocated to a plurality of individuals taking medication at the same administration timing. In a case where specific individuals are not taking medication at specific administration timing, it is possible to arrange not to dispense packs in the sections corresponding to the specific individuals at the specific administration timing.

The embodiment of the medicine dispensing tray is not limited to the above medicine dispensing tray 30. A plurality of sections 33 of the medicine dispensing tray 30 may be allocated for each administration timing of individuals taking medication. Specifically, the sections 33 may be allocated for the administration timings of the packs 2 to be administered, such as morning, noon, evening, and before bedtime, as well as to the individuals taking medication. For the medicine dispensing tray 30 of the above-described example, the medicine dispensing tray 30 is managed for each floor or room in which a plurality of individuals taking medication are resident, and packs 2 for each day (or two or more days) can be dispensed in the medicine dispensing tray 30 in advance.

In the above example, the sections are allocated for each administration timing, such as morning, noon, evening, and before bedtime, thus an erroneous administration timing of each individual taking medication can be avoided. The configuration of the medicine dispensing tray 30 is not limited to the above configuration examples, and various examples may be used by combining individuals taking medication and administration timings, but the description is limited to the above to avoid redundant description of the present disclosure.

Figure 5A:
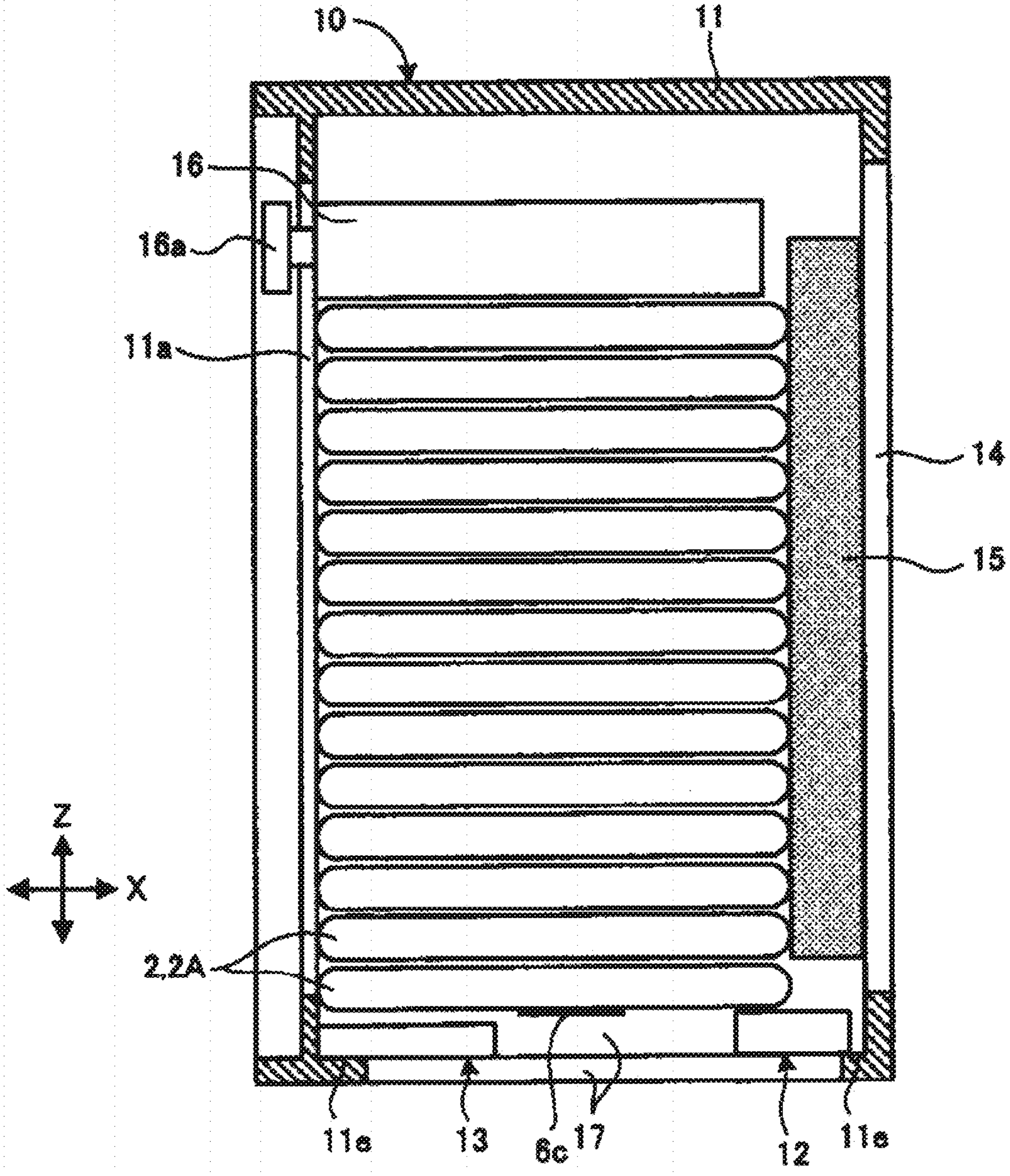
FIG. 5A is a longitudinal cross-sectional view illustrating an example of a cartridge.
Figure 5B:
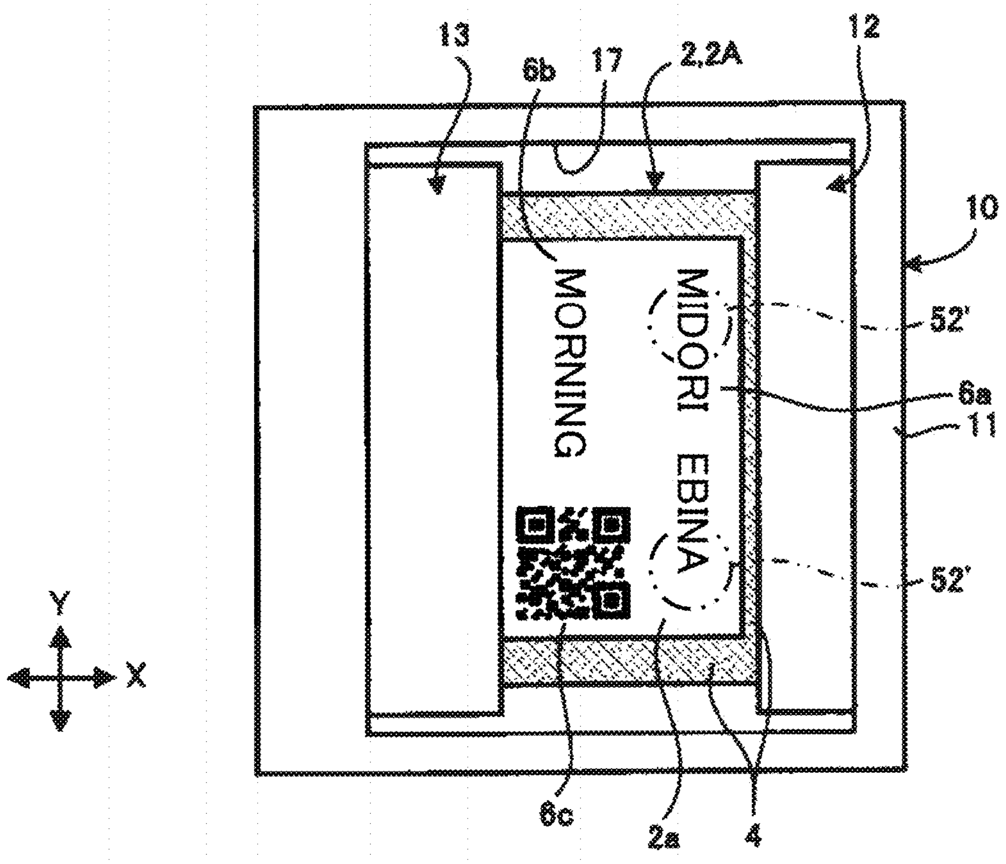
FIG. 5B is a bottom view of the cartridge of FIG. 5A.
Figure 6A:
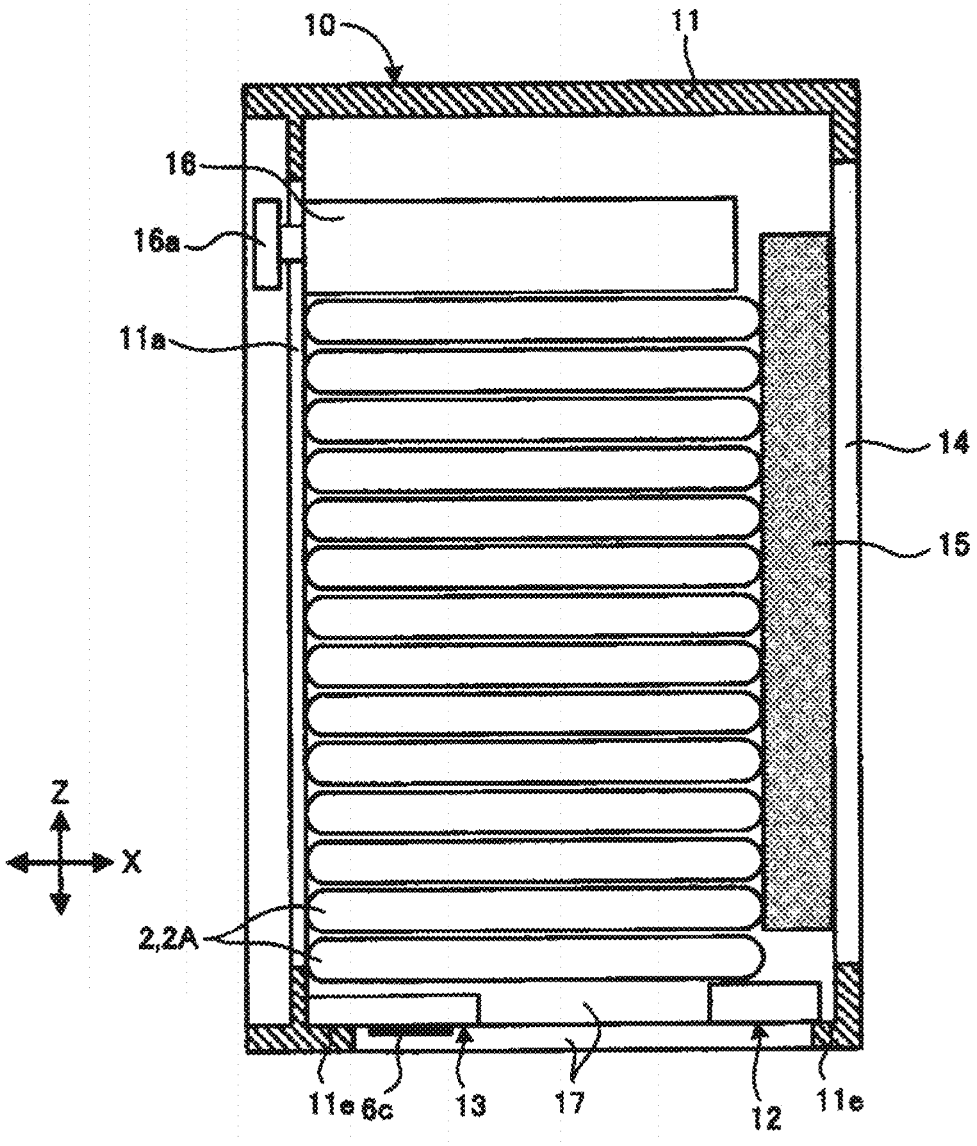
FIG. 6A is a longitudinal cross-sectional view illustrating another example of the cartridge.
Figure 6B:
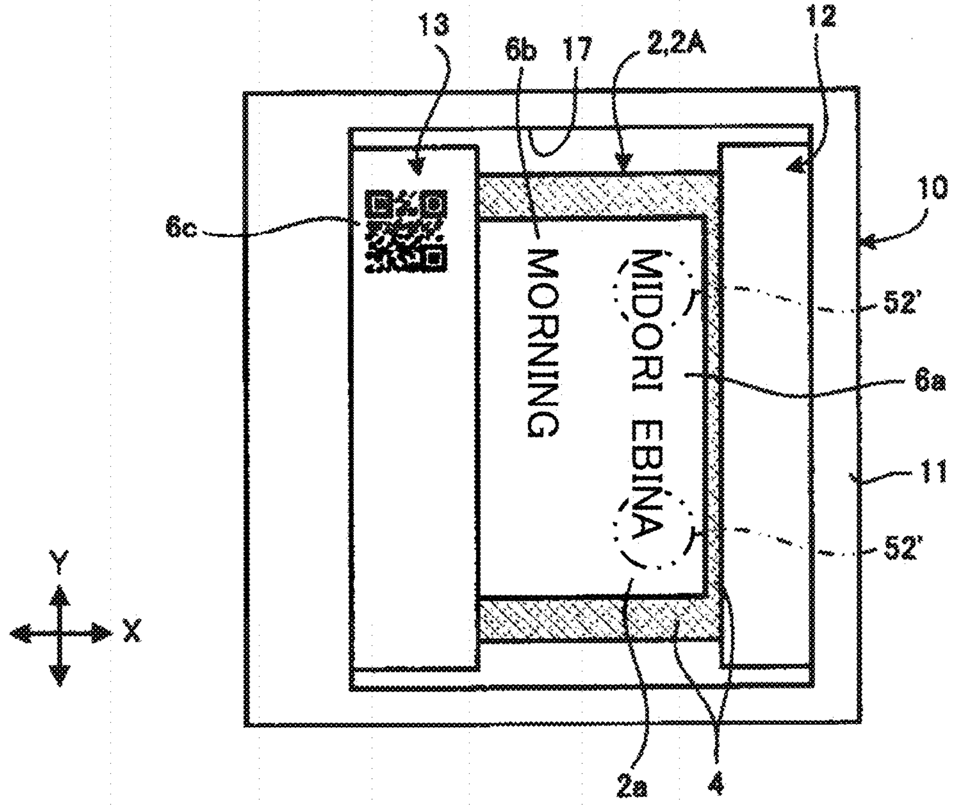
FIG. 6B is a bottom view of the cartridge of FIG. 6A.

An example of the cartridge will be described with reference to FIGS. 5A, 5B, 6*a*, and 6B. FIG. 5A is a longitudinal cross-sectional view of an example of the cartridge. FIG. 6A is a longitudinal cross-sectional view of another example of the cartridge different from the example of FIG. 5A. FIG. 5B is a bottom view of the cartridge of FIG. 5A. FIG. 6B is a bottom view of the cartridge of FIG. 6A. For the sake of simplicity of drawings, the packs 2 are schematically illustrated while omitting the pressure-bonded portions 4 (see FIG. 2A to 2D) of the packs 2 stored in the cartridge 10 in the longitudinal cross-sectional views of FIGS. 5A and 6A. For the same reason, hatching of the cross-section of the support (right support 12, left support 13, etc.) and the cartridge is schematically illustrated.

The configurations of the cartridges 10 illustrated in FIGS. 5A, 5B, 6A, and 6B are the same in terms of shapes etc., but positions and members to which the QR code (registered trademark) of the medication associated information 6*c* is depicted are different. The configuration related to the shape etc., will be described with reference to FIGS. 5A to 5B as a representative example.

The cartridge 10 mainly includes a case 11, a lid 14, a pack discharging opening 17, a movable plate 16, a pack-shape retainer 15, and as a support, a right support 12 and a left support 13.

The case 11 has a function of storing a plurality of packs 2 or pack bundle 2A (the packs 2 will be representatively described hereinafter). The case 11 is formed as an integrated body or a collection of separate parts using, for example, a resin. The lid 14 has a function of allowing the packs 2 to be inserted into the case 11. The pack discharging opening 17 is formed at a lower portion or bottom portion of the case 11, and is an opening from which the packs 2 inside the cartridge 10 are taken out. The pack discharging opening 17 has a function of allowing the packs 2 taken out from the cartridge 10 by the carriage 50 to pass through (see FIGS. 1A, 1B, 9A, 9B, etc.).

The movable plate 16 has a function of preventing the packs 2 from falling and a function of moving the lowermost pack 2 to the vicinity of the pack discharging opening 17 after the first pack is taken out among the maximum number of packs 2 storable within the case 11. The pack-shape retainer 15 has a function of retaining the predetermined shapes or orientations of the packs 2. The right support 12 and left support 13 also have a function of supporting or retaining the packs 2 inside the case 11.

In the present embodiment, the discharging mechanism with which the pack 2 is taken out from the cartridge 10 by the carriage 50 is arranged at the lower portion or the bottom of the cartridge 10. Specifically, the discharging mechanism includes the right support 12 and the left support 13 and the discharging opening 17. The right support 12 and the left support 13 serve as a support or a support member configured to support the pack 2, which is taken out from cartridge 10, at multiple positions.

When the pack 2 is taken out from the cartridge 10 with the carriage 50, the right support 12 and the left support 13 are configured to allow the pack 2 to pass through. When the pack 2 is not taken out from the cartridge 10, the right support 12 and the left support 13 are configured to regulate passage of the pack 2 so that a plurality of packs 2 are stored and retained within the case 11.

As described above, the right support 12 and the left support 13 are supports that support and retain packs 2 inside the cartridge 10, and are disposed in a fixed state so that an operation of taking a pack 2 out from the cartridge 10 by the carriage 50 is stably carried out. The right support 12 and the left support 13 are each a fixed member fixed or fastened to the bottom-wall inner surface 11*e* at the right bottom wall edge or left bottom wall edge of the pack discharging opening 17.

The pack discharging opening 17 has a function of allowing a passage of the below-described suction pads 52 of the carriage 50 illustrated in FIGS. 9A and 9B in order to take out a pack 2, as well as a function of allowing a passage of the taken out pack 2 and the suction pads 52. Specifically, the pack discharging opening 17, and the right bottom wall edge and the left bottom wall edge disposed to surround the pack discharging opening 17 have a function as a passage for the packs that are taken out.

In the cartridge 10 of FIG. 5B. the position 52' (may be also referred to as a "suction pad position" hereinafter) at which the suction pads 52 (see FIG. 11C below) suctions the pack 2 stored in the cartridge 10 is identified as circular shapes with a dash-double-dotted line in FIG. 5B. The right support 12 and the left support 13 support the packs 2 inside the cartridge 10 not to drop the packs 2 of the cartridge 10 from the pack discharging opening 17. As will be described in the operation of the carriage 50 below, when the lowermost pack 2 in the cartridge 10 is suctioned by the suction pads 52 to be taken out, the two suction pads 52 are used to suction the pack 2 in a positional relationship in which the two suction pads 52 are disposed at two positions at both ends of the right support 12 in the Y direction, respectively. When the lowermost pack 2 is taken out from the cartridge 10 by the suction pads 52, the two suction pads 52 pass through in the vicinity of the both ends of the right support 12 in the Y direction to suction and retain the pack 2.

As illustrated in FIGS. 5A and 5B, the two suction pads are arranged at the two positions in the vicinity of the both ends of the right support 12 in the Y direction, thus a potential problem caused by a suction failure of the suction pads 52 can be avoided in advance so that the pack 2 can be assuredly taken out. Specifically, the both sides of the pack 2 in the Y direction are suctioned by the suction pads 52. Therefore, a pouch portion 2*a* of the pack 2 formed of a film is retained to be flat by suction of the two suction pads 52, thereby withstanding deformation. As a result, both assured support or retention of the pack 2 in the cartridge 10 and smooth removal of the pack 2 can be achieved.

The pack-shape retainer 15 is formed of sponge rubber having appropriate elasticity. The movable plate 16 is formed of, for example, a resin or a metal. The pack-shape retainer 15 and the movable plate 16 are configured to retain shapes and orientations of a plurality of packs 2 stored in the case 11 (as illustrated in FIG. 5A, the packs 2 are orderly retained along the Z direction to be substantially horizontal). In order to exhibit the above-described function, the movable plate 16 moves downward in the Z direction within the case 11 by the movable plate's own weight so that at least one pack 2 remaining in the case 11 is assuredly moved toward the pack discharging opening 17.

As illustrated in FIG. 5A, a long groove 11*a* extending in the Z direction with a predetermined width in the X-direction is formed in the side wall of the case 11. A shaft 16*a* with a flange is disposed at one end of the movable plate 16 to be projected from the long groove 11*a*. As the shaft 16*a* is guided along the long groove 11*a* in the Z direction, the movable plate 16 can retain the shapes and orientations of the packs 2 along the Z direction. In FIG. 5A, the packs 2 inside the cartridge 10 are stacked in a substantially horizontal state, and are stored in a state (not illustrated) in which the positions where the medicines are enclosed on the left side of FIG. 5A are inflated, but the detailed state of the packs 2 is omitted.

The packs 2 are set in the case 11 in a manner such that, the packs 2 are sequentially arranged upward from the pack discharging opening 17 in the vicinity of the right support 12 and the left support 13. The timing of replenishing the cartridge 10 with the packs 2 may be, for example, the timing of a medical examination (typically every 2 weeks) of an individual taking medication (resident) of a care facility, or the timing when the packs 2 in the cartridge 10 run out. If one or more packs 2 remain in the cartridge 10 when the cartridge 10 is replenished, packs 2 are sequentially added to the rear of the stack of the remaining packs 2.

The above-described setting of the packs or replenishment of the parks in the cartridge 10 is performed by a staff member etc. of a care facility. However, an embodiment of the setting or replenishment may not be performed by a staff member etc., in a configuration where the storing member is formed as a cartridge, and the packs 2 are automatically loaded.

The lid 14 allows a staff member of a care facility etc. to insert packs 2 or take out the packs 2 stored in the cartridge 10. As illustrated in FIG. 5A, the lid 14 is formed to have a length extending in the Z direction of the case 11 with an predetermined opening width.

As illustrated in FIG. 5B, the packs 2 in the cartridge 10 are classified according to administration timings, for example, medicines of Mr./Ms. A (as a concrete example, Ms. Midori Ebina) for 14 days to be taken in the morning. In a case where Mr./Ms. A (Ms. Midori Ebina) takes medication at noon, in the evening, and before her bedtime, as well as in the morning, a total number of the cartridges 10 for Mr./Ms. A (Ms. Midori Ebina) is four.

The classification is not limited to the above example. For example, a single cartridge 10 may be set per an individual (a person) for taking medication, and the packs may be sequentially arranged upwards from the pack discharging opening 17 of the cartridge 10, from which the packs are discharged, in the order such that morning, noon, evening, and bedtime of the first day, morning, noon, evening, and bedtime of the second day, etc.

The technology proposed by the present inventors in Japanese Unexamined Patent Application Publication No. 2021-185976 is a technology directed to a combination of a left flap portion 12 (a helical torsion spring providing a predetermined range of a bias force is provided between a rotational shaft 12*a* and a right bottom wall edge) and a right flap portion 13 (arranged so that the right flap portion can swing, or open and close around a rotational shaft (not illustrated) disposed at the right bottom edge of the pack discharging opening 17 as a center) of a flap mechanism as illustrated in FIG. 8A of Japanese Unexamined Patent Application Publication No. 2021-185976. However, the above technology has a problem such that a pack is caught between the left flap portion 12 or right flap portion 13 and the bottom-wall inner surface 11*e* of the pack discharging opening 17 when the pack is taken out from the cartridge (storing member), thereby inhibiting a stable discharge operation of packs 2.

In order to solve the above problem, according to one embodiment of the present disclosure, the right support 12 and the left support 13 are fixed as fixed members to the bottom-wall inner surface 11*e* of the pack discharging opening 17 of the case 11 so that a discharge operation of a pack 2 from the cartridge 10 by the carriage 50 is always stably performed. Specifically, the right support 12 and the left support 13 are arranged in a fixed state to retain both edges of a medical pack (e.g., a pack 2 and a pack bundle 2A) at the pack discharging opening 17 in a lower portion of the cartridge 10.

An edge of the pack 2 at a side which is to be suctioned is supported by the right support 12 and an opposite edge of the pack 2 is supported by the left support 13 so that the packs 2 stored in the cartridge 10 in the set state are supported without being dropped. The right support 12 and the left support 13 have mutually different support lengths to support the packs 2. The support length of the right support 12 is shorter than the left support 13. The medicine pack (e.g., the pack 2) is configured to be elastic or freely deformable and is operated (see FIG. 11C below) to be easily pulled out by bending when the very bottom (lowermost) pack 2 stored in the cartridge 10 is suctioned by the suction pads 52 and pulled out from the cartridge 10.

Since the support (the right support 12 and the left support 13) is fixed, the support can securely retain a leading edge of a subsequent pack 2 so that the subsequent pack 2 does not jump out or fall together with the preceding pack 2. Moreover, the support (the right support 12 and the left support 13) does not swing nor rotate, thus deformation of the packs 2 due to charging or pushing back potentially caused by the returning movements of the support from swinging or rotating can be avoided, and the packs 2 are stably retained.

Figure 9A:
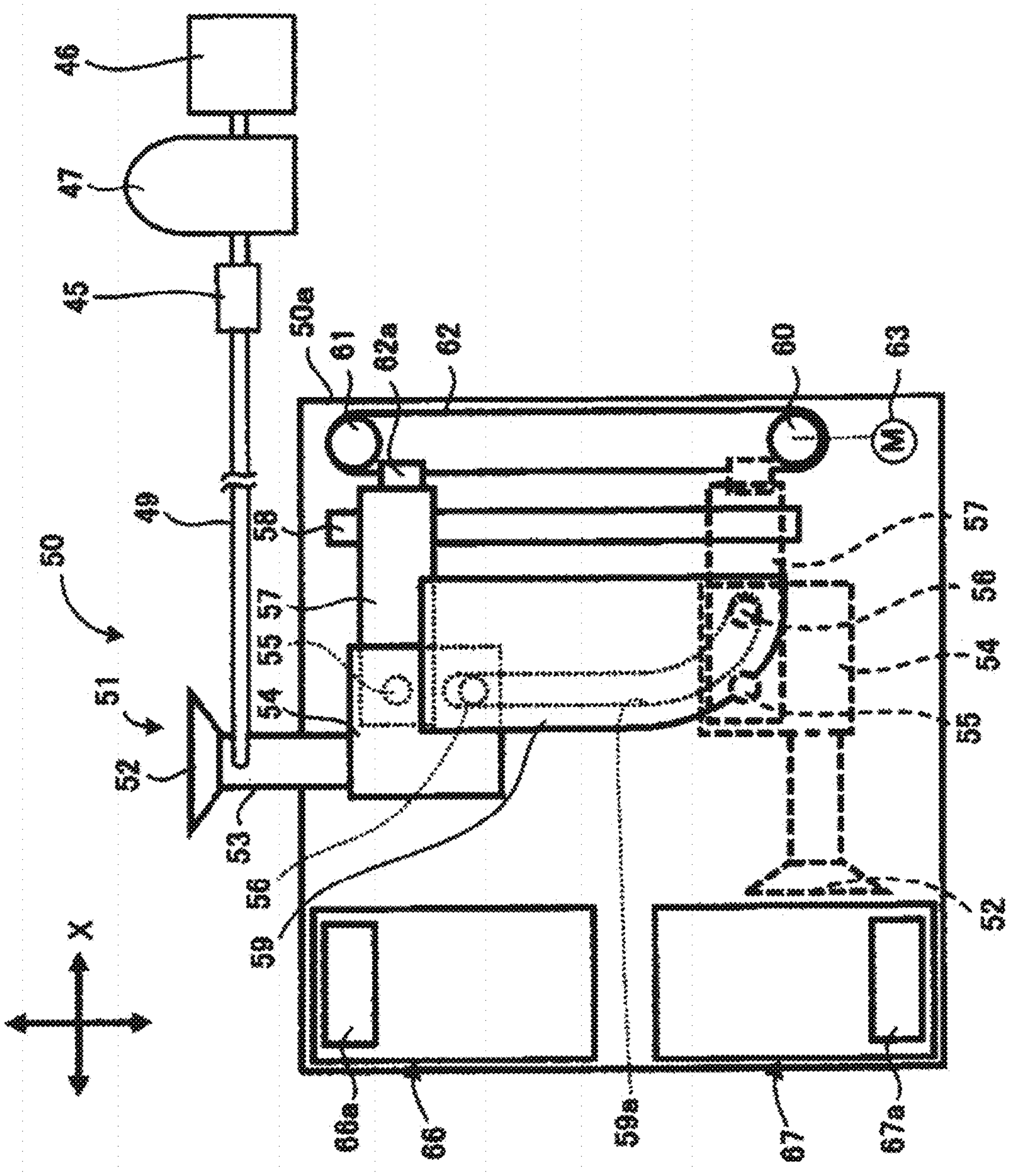
FIG. 9A is a front view illustrating an example of a configuration of a carriage.
Figure 9B:
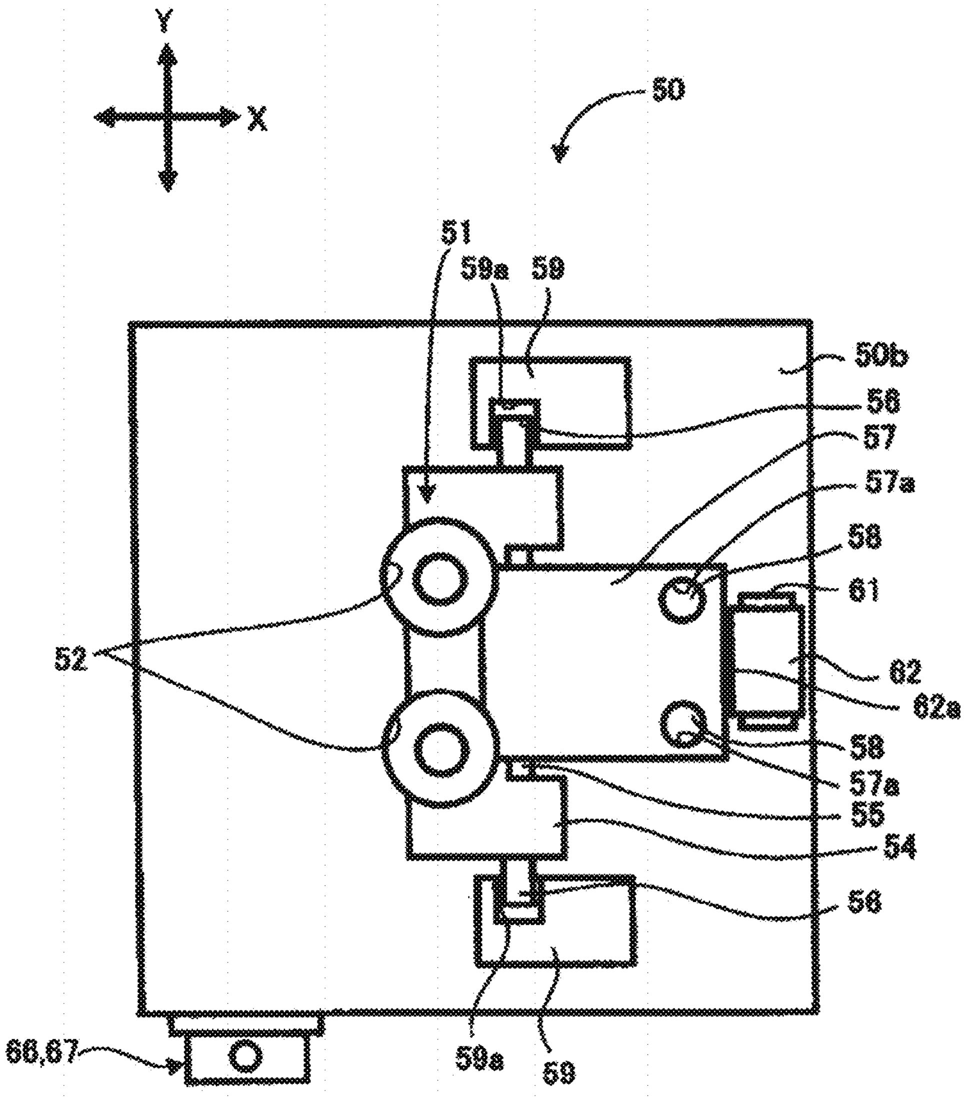
FIG. 9B is a plan view of FIG. 9B.

As illustrated in FIGS. 5A and 5B, medication associated information 6*a*, 6*b*, and 6*c* depicted on the medical pack (e.g., the pack 2 and the pack bundle 2A) is exposed from the pack discharging opening 17 of the cartridge 10, the medication associated information 6*c* of the medicine pack can be read by the upper QR code reader 66 mounted on the carriage 50 as illustrated in FIGS. 9A and 9B below. For the sake of simplicity of illustration, the medication associated information 6*c* is depicted only on the lowermost pack 2 or pack bundle 2A stored in the cartridge 10 in FIG. 5A. However, it is needless to say that the medication associated information 6*c* is depicted on all of the packs 2 or pack bundles 2A stored in the cartridge 10.

In a case where the medication associated information 6*c*, such as a QR code (registered trademark), cannot be depicted on the medicine pack (e.g., the pack 2 and the pack bundle 2A) (for example, a case where a packaging machine used to produce packs 2 cannot print a QR code (registered trademark)), the medication associated information 6*c* may be arranged as illustrated in FIGS. 6A and 6B. Specifically, a label to which a QR code (registered trademark) of the medication associated information 6*c* is attached is adhered to a bottom surface of the left support 13 in the vicinity of the pack discharging opening 17, as illustrated in FIGS. 6A and 6B. According to the above configuration, the medication associated information 6*c* of the medicine packs (e.g., the packs 2 and the pack bundles 2A) stored in the cartridge 10 can be obtained. In order to obtain the medication associated information 6*c*, a QR code (registered trademark) may be directly printed on the cartridge 10 instead of adhesion of the label of the QR code (registered trademark).

Figure 7:
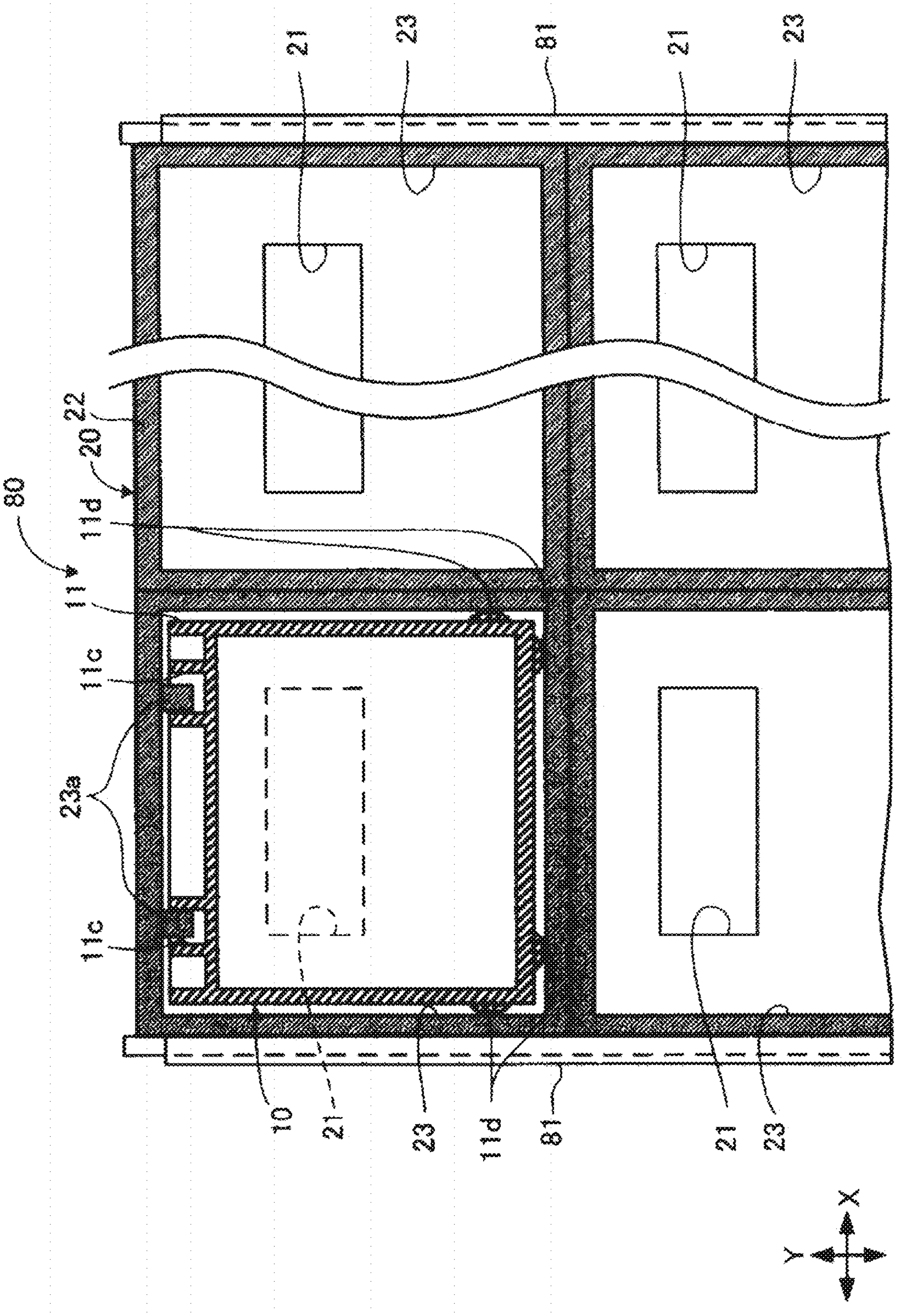
FIG. 7 is a horizontal cross-sectional view illustrating an example of a main part of a cartridge release system disposed on a drawer.
Figure 8:
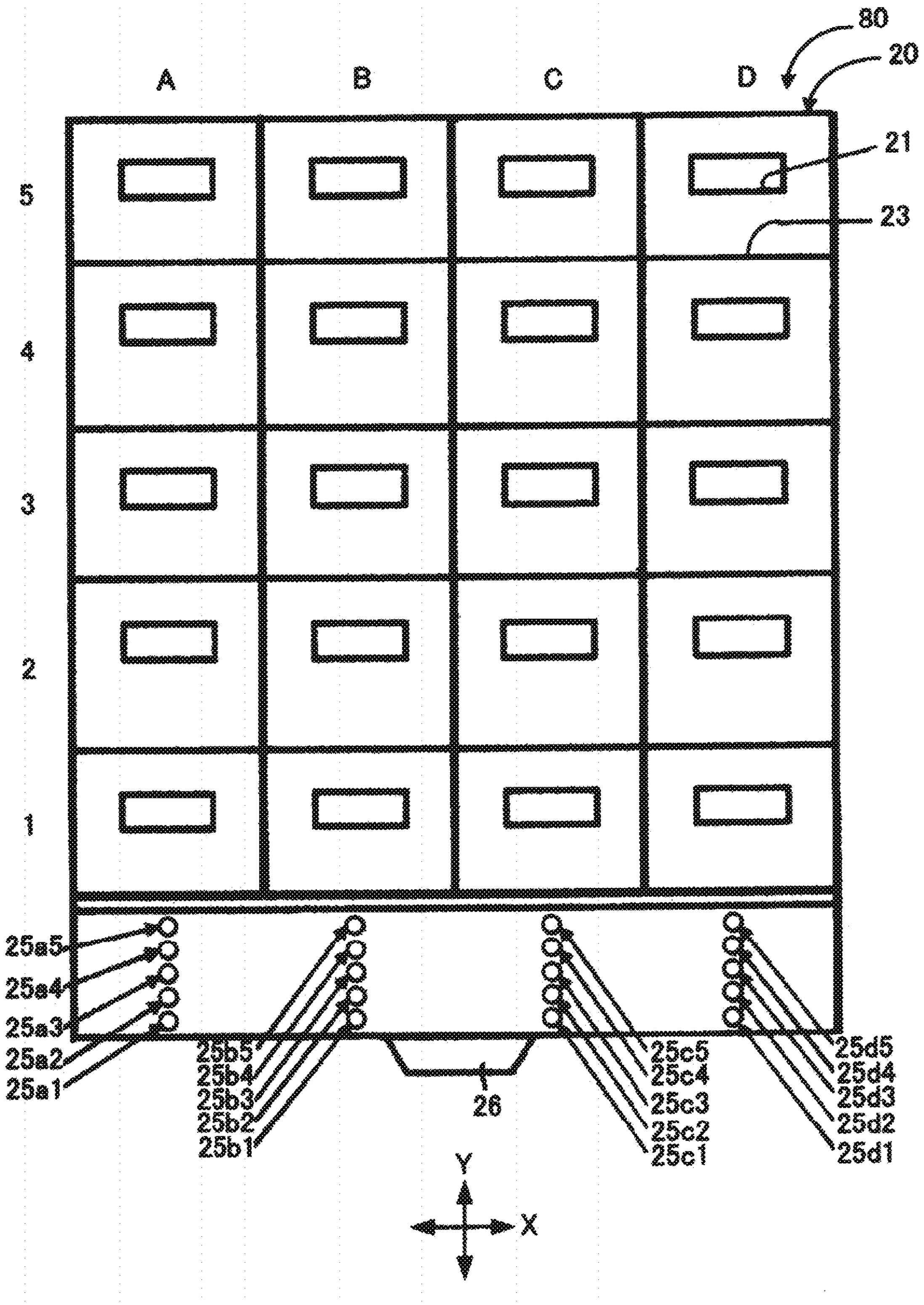
FIG. 8 is a schematic plan view illustrating an identification configuration for cartridges disposed on the drawer.

A release system and operation of the cartridge disposed on the drawer will be described with reference to FIGS. 7 and 8. FIG. 7 is a cross-sectional plane view illustrating an example of a main part of the release system of the cartridge disposed on the drawer. FIG. 8 is a schematic plan view illustrating an identification system of the cartridges disposed on the drawer. As illustrated in FIG. 7, the drawer 80 is configured to detachably store a plurality of cartridges 10 via a cartridge tray 20. The detachably configured cartridge 10 may be generally also referred to as a "storing member." The drawer 80 is configured to form an integrated structure with the cartridge tray 20 to retain the cartridge tray 20. Slide rails 81 are disposed on left and right outer wall surfaces of the case 22 of the cartridge tray 20 in the drawer 80, respectively. The slide rails 81 are slidable and engaged with the main body rails (not illustrated) disposed on the main body frame 199 (see FIGS. 1A and 1B). According to the above configuration, the drawer 80 (cartridge tray 20) can be pulled out from the main body frame 199 (see FIGS. 1A and 1B) to detach the cartridges 10 through the engagement between the slide rails 81 and the main body rails (not illustrated).

As illustrated in FIG. 7, attachment or detachment of the cartridge 10 from the cartridge tray of the drawer 80 is performed through engagement or disengagement between a pair of projections 23*a* formed on an inner wall surface of the case 22 of the drawer 80 to project inward, and a pair of recesses 11*c* formed on an outer wall of the case 11 of the cartridge 10, and engagement and disengagement between the inner wall surface of the case 22 and four hemispherical protrusions 11*d* formed on the outer wall of the case 11. According to the above release configuration of the drawer 80, attachment or detachment operations of a plurality of cartridges 10 can be easily performed with desired operatability. In the above example, attachment or detachment can be realized through the engagement (fitting) between the projection and the recess. However, the embodiment to realize attachment or detachment is not limited to the above. For example, an effect comparable to the above can be obtained by a configuration where an elastic material is disposed in a gap between an inner wall surface of the case 22 and an outer wall surface of the case 11, a configuration using a magnetic force, or a snap-fit structure. As illustrated in FIGS. 7 and 8, openings 21 are formed in the bottom wall of the cartridge tray 20 of the drawer 80, and when cartridges 10 are mounted in storing members 23 of the cartridge tray 20, respectively, each opening 21 is configured to communicate with the pack discharging opening 17 (see FIGS. 5A, 5B, 6A, and 6B) of each cartridge 10. The shapes of the openings 21 of the cartridge tray 20 of FIGS. 7 and 8 are schematically illustrated as relatively small rectangular shapes. However, it is needless to say that the openings 21 may be appropriately formed according to embodiments or examples as illustrated in FIGS. 18A-1 to 18B-2, 19, and 20A to 20B below.

As illustrated in FIG. 8, the cartridge tray 20 of the drawer 80 includes twenty storing members for storing twenty cartridges 10, which are arranged in four columns A to D in the horizontal direction (the X direction) and five rows 1 to 5 in the vertical direction (the Y direction). The drawer 80 includes a guide display, such as light emitting diodes (LED) 25*al* to 25*d*5 to indicate set positions of a plurality of cartridges 10, in the vicinity of a handle 26 held by a hand when an attachment or detachment operation is performed. According to the above configuration, a user can recognize at a glance where the target cartridge 10 is in the drawer 80 and the cartridge tray 20. In FIG. 8, the LED 25*al* is configured to detect the presence or absence of the cartridge 10 to be attached or detached corresponding to the storing member A1 of the cartridge tray 20 (representing a position or section specifically determined by the vertical column and the horizontal raw). Similarly, the LED 25*a*2 corresponds to the position of the storing member A2 of the cartridge tray 20, the LED 25*a*3 corresponds to the position of the storing member A3 of the cartridge tray 20, the LED 25*a*4 corresponds to the position of the storing member A4 of the cartridge tray 20, and the LED 25*a*5 corresponds to the position of the storing member A5 of the cartridge tray 20. Similarly, as illustrated in FIG. 8, the storing members 1 to 5 in the rows B to D are provided with LEDs for indicating the presence or absence of the cartridge 10 to be attached to or detached from each storing member.

In the case of the guide display, such as the LEDs 25*a*1 to 25*d*5, a staff member serving as an operator to mount a cartridge 10 in a storing member 23 may displace (erroneously mount) the cartridge 10 in a storing member other than the predetermined storing member 23 by erroneously recognizing the lighting location of the LEDS 25*a*1 to 25*d*5. Therefore, instead of the guide display (e.g., the LEDs 25*a*1 to 25*d*5), for example, a detector, such as a sensor and a switch, may be disposed at each of the storing members 23 to electrically (automatically) identify the presence or absence of the cartridge 10.

In order to identify individual storing members, a number, barcode, QR code (registered trademark), or contactless IC tag may be disposed at each of the storage units to record which storing member contains whose medication using the system of the device main body. Then, when a drawer on which storing members are disposed is mounted in the device main body, the device main body can identify the individual storing members. According to the above configuration, the device can collect and pick up a target pack without an error.

The cartridge tray 20 disposed in the drawer 80 illustrated in FIGS. 7 and 8 also includes a structure configured to detect an attachment or detachment (replacement) of the cartridge 10 by a sensor, which corresponds to a main part of the present embodiment and will be described in detail below with reference to FIG. 15 etc.

A configuration and operation of the carriage (discharging mechanism, discharger) will be described with reference to FIGS. 9A to 12C. FIG. 9A is a front view illustrating an example of a configuration of the carriage, and FIG. 9B is a plan view of FIG. 9A. FIGS. 10, 11A to 11F, and 12A to 12C are front views illustrating the transition of the operation of the carriage. For the sake of simplicity of illustration, a view illustrating a connection relationship, such as with a negative pressure generator 45, in the configuration of the carriage is only depicted in FIG. 9A, and is omitted in FIG. 10, FIG. 13, etc.

As illustrated in FIGS. 9A and 9B, the carriage 50 includes a suction member configured to take out a pack 2 from the cartridge 10 and holds the pack 2. The suction member 51 has a function of suctioning and releasing the pack 2. When suctioning of the pack 2 is carried out, the suction member 51 has a function of using a negative pressure air flow converted by the negative pressure generator 45 serving as a negative pressure switch to suction the pack 2. When the release of the pack 2 is carried out, the suction member 51 has a function of applying a pressurized air flow converted by the negative pressure generator 45 to release the pack 2.

As illustrated in FIG. 9A, in the above suction member 51, a positive pressure from an air compressor 46 serving as an air compressing device is converted into a negative pressure by the negative pressure generator 45 via an air tank 47 to suction the pack 2 in the negative pressure state. The air compressor 46 is installed outside the transporting device 90, and is coupled to the suction member 51 via the air tank 47 and the negative pressure generator 45 with a communication member, such as an air pipe 49. A pressure sensor (not illustrated) configured to measure the negative pressure is disposed at the air pipe 49 between the negative pressure generator 45 and the suction member 51. When the negative pressure measured by the pressure sensor is equal to or lower than the predetermined value, it is determined that the suction member 51 suctions the pack 2.

The air pipe 49 is disposed through cable pairing together with a harness so that the air pipe 49 does not stretch when the carriage 50 inside the medicine dispenser 200. Specifically, as illustrated in FIGS. 1A and 1B, the air pipe 49 has a passage that makes one turn along each of the X axis, the Y axis, and the Z axis. The air pipe 49 is extended from the negative pressure generator 45 in the Z-axial direction, makes one turn, is extended in the X-axial direction, makes one turn, is extended in the Y-axial direction, and then makes one turn to be coupled to the suction member 51.

The suction member 51 includes suction pads 52 configured to suction a pack 2, and a suction duct 53 configured to couple to the suction pads 52. The negative pressure generator 45 is also referred to as a vacuum ejector valve, and is communicated with the suction duct 53 via the air pipe 49. The suction pads 52 each have a function as an air suction device or a suction member configured to suction and take out a pack 2 in the cartridge 10. As illustrated in FIG. 9A, the top end, which is one end, of the suction pads 52 is disposed to suction the pack 2 as described above. The bottom end, which is the other end, of the suction pads 52 illustrated in FIG. 9A is fixed to a top end, which is one end, of the suction duct 53 illustrated in FIG. 9A. The bottom end, which is the other end, of the suction duct 53 illustrated in FIG. 9A is attached to and fixed on the suction pad supporting member 54. A pair of the suction pads 52 and a pair of the suction ducts 53 are arranged in the Y direction.

The carriage 50 also includes an orientation changer configured to change the orientation of the pack 2 taken out from the cartridge 10 to a substantially vertical state. The orientation change of the carriage 50 includes, as main constituent members, a suction pad supporting member 54 coupled to a suction member base 57 via a rotational shaft 55, a guide member 59 in which a specific shape of a guide groove 59*a* is formed, a guide shaft 56 always engaged with the guide groove 59*a* of the guide member 59 to guide the suction pad supporting member 54, and a suction-member lifting mechanism.

The suction pad supporting member 54 is coupled to the suction member base 57 via the rotational shaft 55. The suction pad supporting member 54 may be rotatably disposed (i.e., disposed to be swingable) around the rotational shaft 55 fixed on the suction pad supporting member 54 at a predetermined angular range, or may be disposed to be swingable around the rotational shaft 55 fixed on the suction member base 57. Specifically, in FIGS. 9A and 9B, the distance between a center of the rotational shaft 55 and a center of a guide rod 58 described below is set to always maintain a constant distance when the suction member base 57 moves in the up-down direction along the guide rod 58.

The suction-member lifting mechanism includes a pair of guide rods 58 configured to guide the suction member base 57 in the Z direction and disposed in the Y direction, an endless belt 62 supported by and suspended around a drive pulley 60 and a driven pulley 61, and a drive motor 63 coupled to the drive pulley 60 via a drive transmission member, such as a gear and a belt. The drive motor 63 is a driver or a drive source for the suction-member lifting mechanism.

The suction member base 57 is joined with and fixed to the belt 62 with a belt grip 62*a* fixed at a right edge of the suction member base 57. A pair of the guide rods 58 are disposed in the Y direction, and each of the guide rods 58 extends in the Z direction. The bottom ends of the guide rods 58 are fixed on a bottom frame 50*b* of a discharge frame 50*a* disposed on the carriage 50.

Guide holes 57*a*, into which the guide rods 58 are inserted, are formed at the right end side of the suction member base 57. The pulley shafts (not illustrated) of the drive pulley 60 and the driven pulley 61 are each rotatably supported by an immovable member at the side of the discharge frame 50*a*. The drive motor 63 is fixed on an immovable member at the side of the discharge frame 50*a* of the carriage 50.

When the suction member base 57 is moved up and down by the operation of the drive motor 63, the suction member base 57 moves in the Z direction along the guide rods 58, thus the orientation of the X-Y plane of the suction member base 57 can be constantly retained in a substantially horizontal state. The suction-member lifting mechanism is not limited to the up-down reciprocating motion mechanism driven by the belt, and may also be a rectilinear motion mechanism etc., using a rack and pinion.

A pair of guide members 59 is disposed at the both sides of the suction member 51 in the Y direction with the suction pad supporting member 54 being interposed between the pair of guide members 59, and bottom ends of the guide members 59 are fixed on the bottom frame 50*b*. The guide shaft 56 is disposed to be projected from the both ends of the suction pad supporting member 54 in the Y direction, and is always engaged with the guide groove 59*a* of the guide member 59 to guide the suction pad supporting member 54. As illustrated in FIG. 9A, the guide shaft 56 is disposed below the rotational shaft 55 of the suction pad supporting member 54 in the Z direction with a certain distance set between the guide shaft 56 and the rotational shaft 55.

When the suction member base 57 is moved in the Z direction by the operation of the drive motor 63, the guide shaft 56 of the suction pad supporting member 54 moves in the Z direction along the specific shape of the guide groove 59*a*, while constantly retaining the orientation of the X-Y plane of the suction member base 57 in a substantially horizontal state. Therefore, it is possible to rotate the orientation of the suction pad 52 by substantially 90 degrees (the state where the suction member 51 is rotated by substantially 90 degrees is illustrated with thick dash lines in FIG. 9A). The substantially horizontal state includes, in addition to a horizontal state, a state within a predetermined angular tolerance range with respect to the horizontal.

The specific shape of the guide groove 59*a* includes a first guide groove portion and a second guide groove portion. The first guide groove portion is relatively long and extends in the Z direction so that the orientation of the suction pads 52 is retained to face upward as depicted in the solid lines in FIG. 9A through the suction pad supporting member 54 in the substantially horizontal state by the guide of the guide shaft 56. The second guide groove portion is communicated with and connected to the first guide groove portion, and gradually curves in a mild arc shape toward the right side as getting closer to the bottom side of the second guide groove portion so that the orientations of the suction pad supporting member 54 and the suction pads 52 are rotated by substantially 90 degrees.

As illustrated in FIGS. 9A and 9B, an upper QR code reader 66 serving as a medication associated information reader or pack information reader is mounted on the carriage 50. The upper QR code reader 66 is configured to read the QR code of the medication associated information 6*c* (see FIG. 5) depicted on a pack 2 etc., stored in the cartridge 10. The upper QR code reader 66 includes an upper reader 66*a* configured to read the medication associated information 6*c* at an upper portion, and also has a function as a medication associated information reader 65 (see FIGS. 15 and 16 below). The upper QR code reader 66 is attached to the side surface of the carriage 50. The upper QR code reader 66 is also used when a QR code (registered trademark) of the medication associated information 6*c* depicted on a label (see FIGS. 6A and 6B) adhered to the left support 13 of the pack discharging opening 17 of the cartridge 10 is read. An operation of reading a QR code (registered trademark) of the medication associated information 6*c* by the upper reader 66*a* of the upper QR code reader 66 will be described through an example where reading is performed immediately before the operation of taking a pack 2 out from the cartridge 10 by the carriage 50.

In FIGS. 9A and 9B, a lower QR code reader 67 serving as the medication associated information reader 65 or a pack information reader is also mounted on the carriage 50. The lower QR code reader 67 is configured to read a QR code (registered trademark) of the medication associated information 6*c* of the label 7 adhered to the compartment box 34 as illustrated in FIGS. 4A and 4B. The lower QR code reader 67 includes a lower reader 67*a*, which also functions as the medication associated information reader 65, in the lower portion, and is attached to the side surface of the carriage 50 below the upper QR code reader 66. The operation of reading a QR code (registered trademark) of the medication associated information 6*c* of the compartment box 34 by the lower reader 67*a* of the lower QR code reader 67 will be described through an example where reading is performed immediately before the operation of dispensing the pack 2 taken out from the cartridge 10 to the compartment box 34 of the medicine dispensing tray 30.

The operation of the carriage 50 will be described with reference to FIGS. 10, 11A to 11F, and 12A to 12C. For the sake of simplicity of illustration and easy understanding, it is assumed that the carriage 50 is positioned in the vicinity of the bottom side of the cartridge tray 20 retained by the upper drawer 80 of the two drawers 80 arranged on the upper and lower sides of the main body frame 199 in FIGS. 1A and 1B by the operation of the transporting device 90 of FIGS. 1A and 1B. It is also assumed that the cartridge 10 illustrated in FIGS. 5A and 5B and the cartridge tray 20 illustrated in FIGS. 1A and 1B are used. In order to simplify the view to facilitate understanding, illustrations of the QR code (registered trademark) of the medication associated information 6*c*, the upper QR code reader 66, and the lower QR code reader 67 are intentionally omitted in FIGS. 11A to 11F and FIGS. 12B and 12C.

Figure 10:
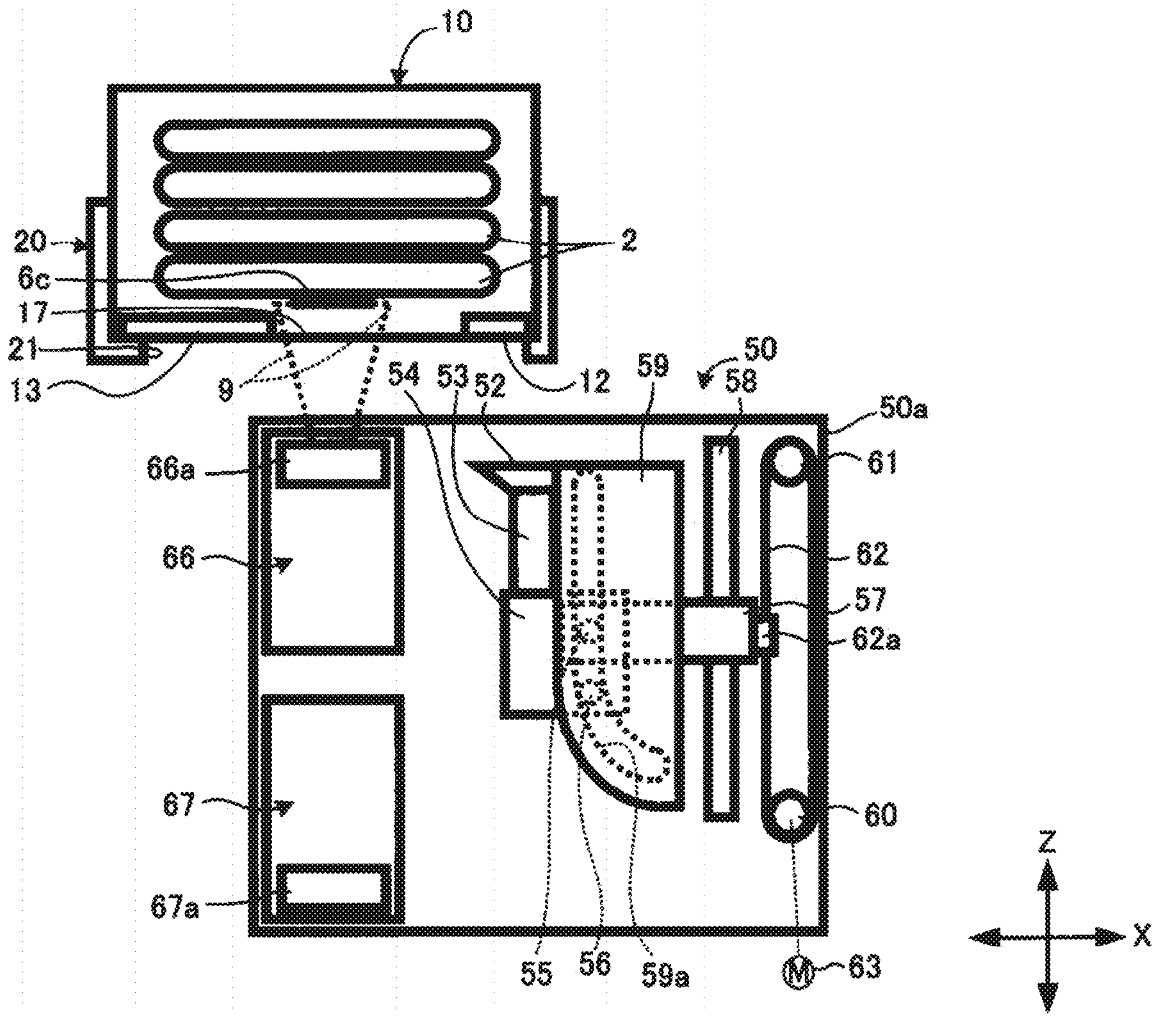
FIG. 10 is a front view illustrating an example of a transition of an operation of the carriage.

In FIG. 10, the carriage 50 can be moved in the region below the cartridge 10 and the cartridge tray 20 in the X and Y directions by the transporting device 90 of FIGS. 1A and 1B. As illustrated in FIG. 10, first, the carriage 50 is moved to a position below the cartridge tray 20 retaining a cartridge 10 in which a target pack 2 to be taken out is stored to position as follows. Specifically, the upper reader 66*a* in the upper QR code reader 66 of the carriage 50 is positioned substantially immediately below the cartridge tray 20 and the cartridge 10 (a reading range 9 in which a QR code (registered trademark) of the medication associated information 6*c* of the lowermost pack 2 stored in the cartridge 10 can be read from the opening 21 of the cartridge tray 20). In the state in which the carriage 50 is in the above position, the upper reader 66*a* of the upper QR code reader 66 reads the QR code (registered trademark) of the medication associated information 6*c* depicted on the pack 2.

Figure 11A:
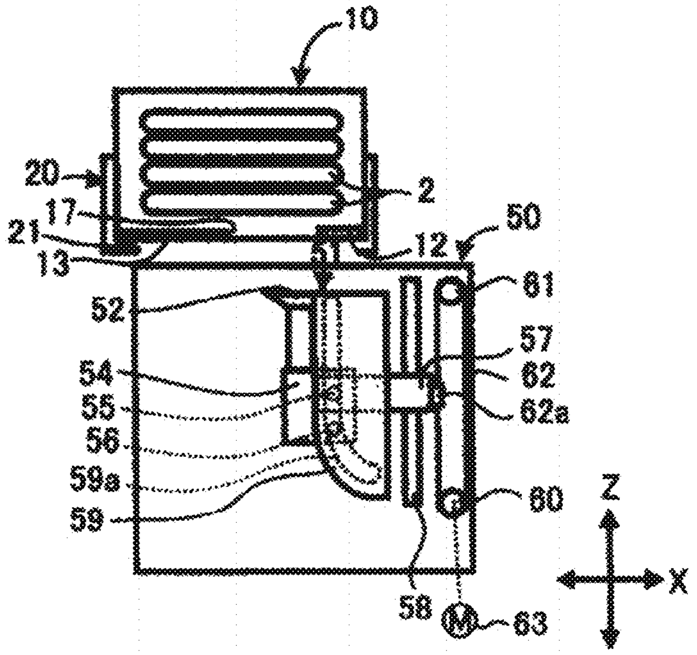
FIGS. 11A to 11F are front views illustrating the transition of the operation of the carriage subsequent to FIG. 10.
Figure 11B:
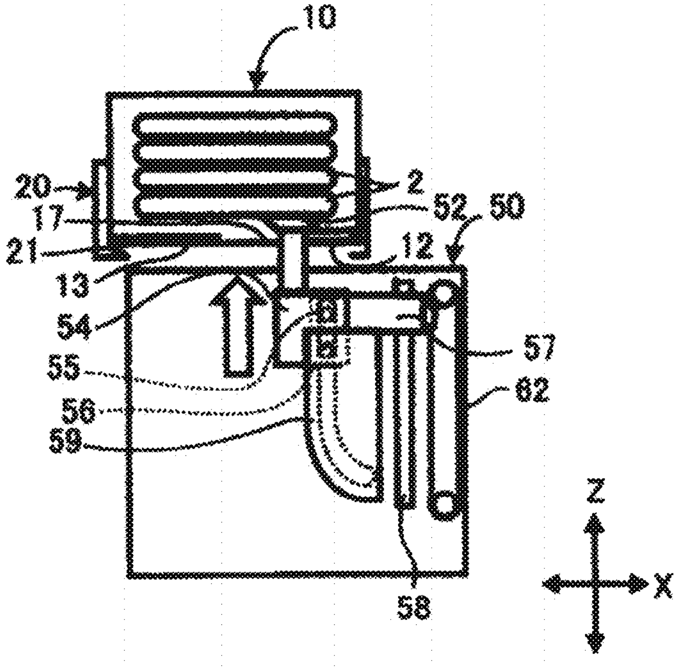

Next, the carriage 50 is moved from the position of FIG. 10 to a slightly right side in the X direction by the transporting device 90 of FIGS. 1A and 1B, as illustrated in FIG. 11A, so that the carriage 50 is moved to a position at which the lowermost pack 2 can be taken out from the cartridge 10 and is stopped. During the above operation, the drive motor 63 of the suction-member lifting mechanism is stopped, and the suction pads 52 are positioned below the position of the upper surface of the discharging mechanism (the upper surface of the discharge frame 50*a* of the carriage 50). Then, as illustrated in FIG. 11B, the suction pads 52 are moved upward by the action of the drive motor 63 to enter the pack discharging opening 17 between the right support 12 and the left support 13 to come into a contact with the lowermost pack 2 in the cartridge 10. The suction pads 52 suction the pack 2 as the same time as the suction pads 52 are in contact with the pack 2. For the above process, the negative pressure generator 45 is driven in advance to generate a negative pressure, thereby creating a state in which a suction operation of a pack 2 can be carried out.

Figure 11C:
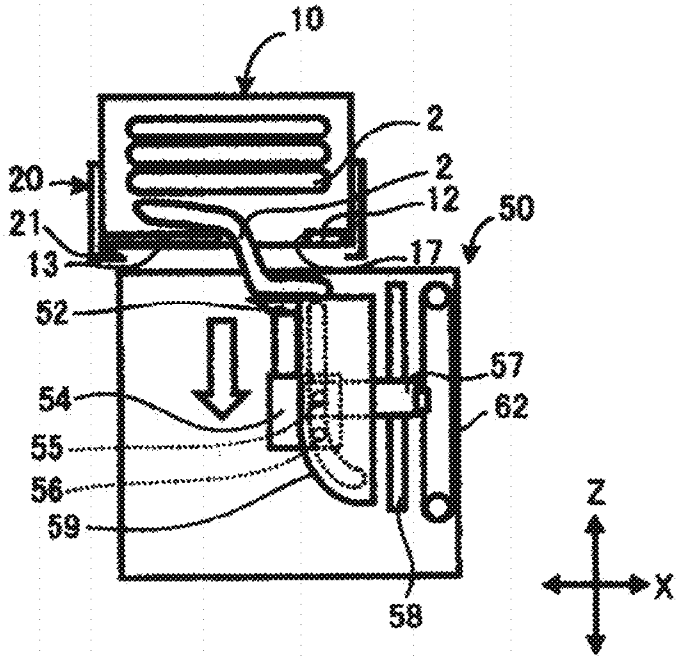

Subsequently, as illustrated in FIG. 11C, the suction pads 52 are moved downward by the reverse action of the drive motor 63, while suctioning the pack 2 with the suction pads 52, to pull out a leading edge (the side sucked by the suction pads 52, which is referred in the same manner hereinafter) of the pack 2, as a one edge of the pack 2, from the cartridge 10.

Figure 11D:
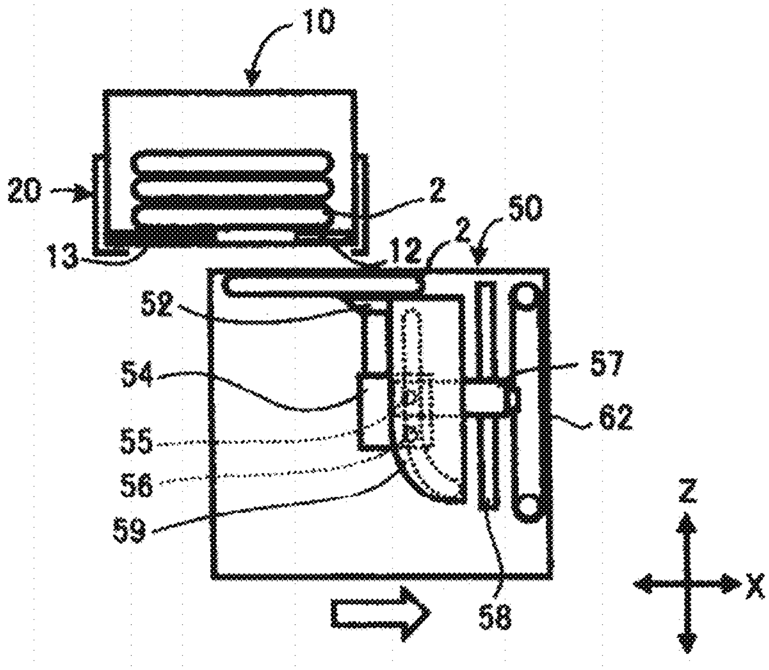
Figure 11E:
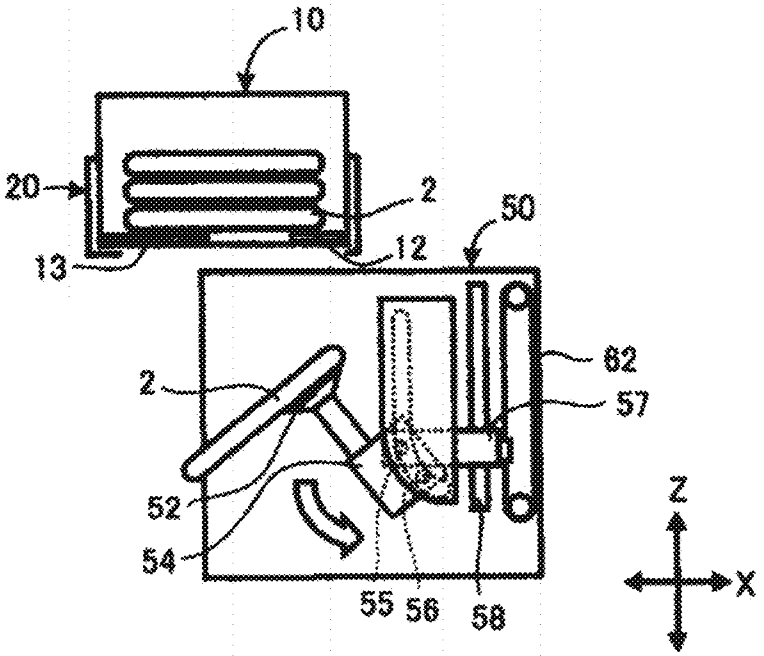
Figure 11F:
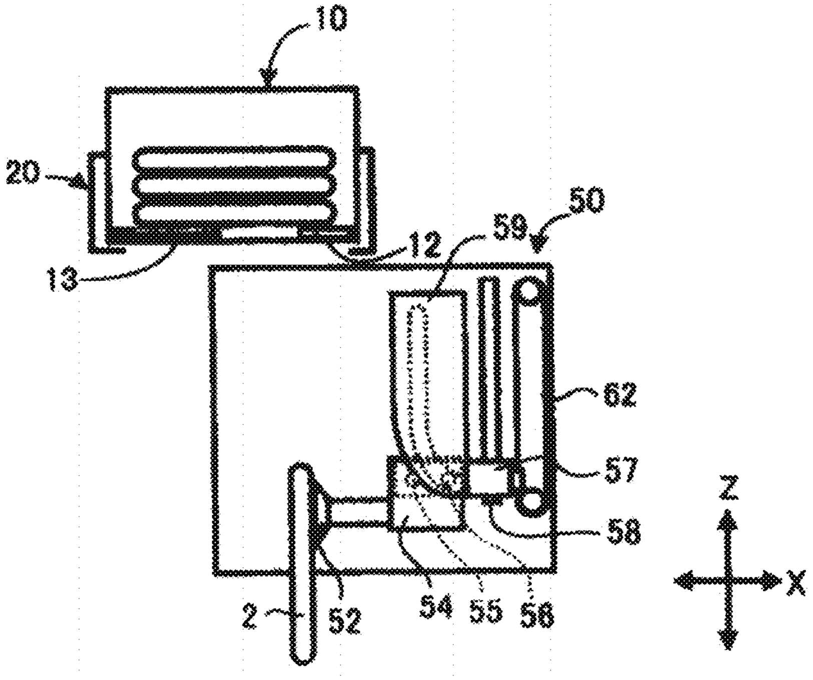

Next, as illustrated in FIG. 11D, the carriage 50 is moved in the X direction, which is a horizontal direction, by the action of the transporting device 90 to pull out the rear end of the pack 2 from the cartridge 10. Immediately after pulling out the pack 2, as illustrated in FIGS. 11E to 11F, the orientation of the pack sucked and held by the suction pads 52 in the substantially horizontal state is rotated by the action of the drive motor 63 by substantially 90 degrees to change the orientation from the substantially horizontal state to a substantially perpendicular state (may be referred to as a substantially vertical state hereinafter). During the rotational movement, the guide shaft 56 disposed in the suction pad supporting member 54 is movably transported along the guide groove 59*a* of the guide member 59 so that the orientation of the pack 2 from the substantially horizontal state to the substantially vertical state. The above operation can be performed by a series of actions of the single drive motor 63 as a drive source.

Figure 12A:
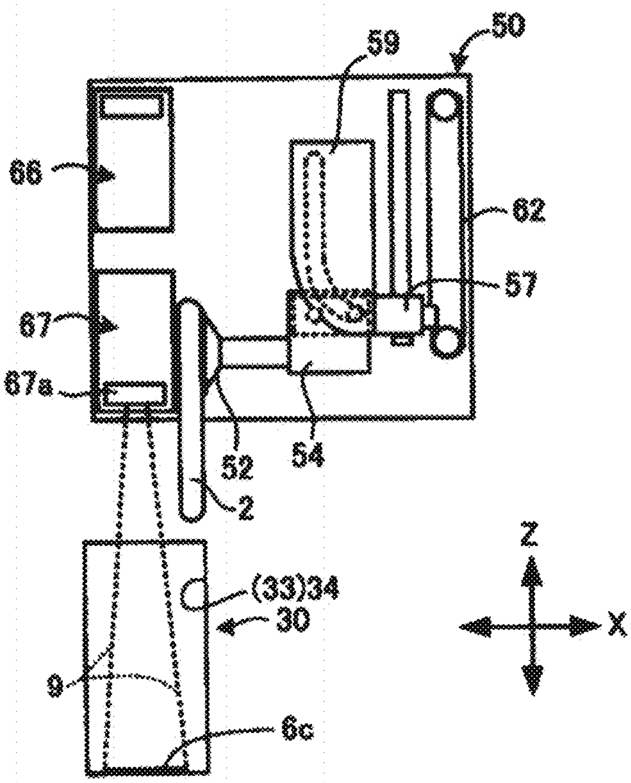
FIGS. 12A to 12C are front views illustrating the transition of the operation of the carriage subsequent to FIGS. 11A to 11F.

Next, as illustrated in FIG. 12A, the carriage 50 that includes the suction pads 52 holding the pack 2 oriented in the substantially vertical state is transported to a predetermined position by the transporting device 90. Once the lower reader 67*a* in the lower QR code reader 67 of the carriage 50 is in the predetermined position, which is a reading range 9 of the QR code (registered trademark) of the medication associated information 6*c* depicted on the bottom portion of the predetermined compartment box 34 (or the predetermined section 33) of the medicine dispensing tray 30, the lower reader 67*a* reads the QR code (registered trademark) of the medication associated information 6*c*.

Figure 12B:
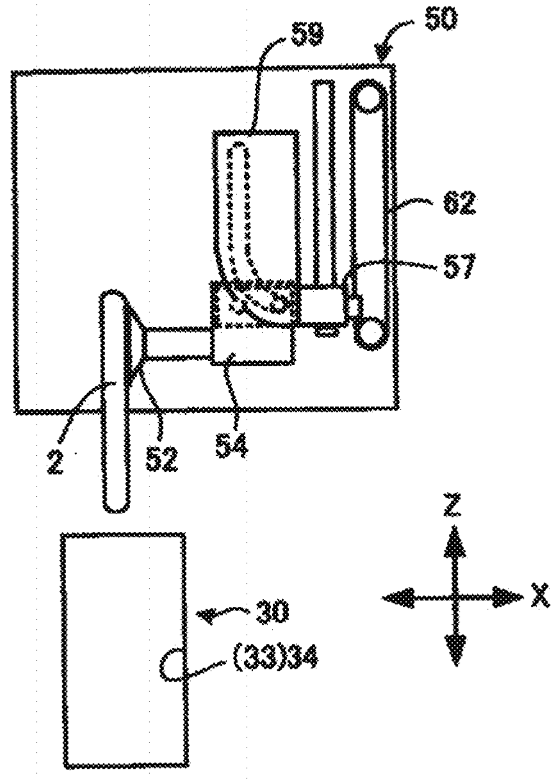
Figure 12C:
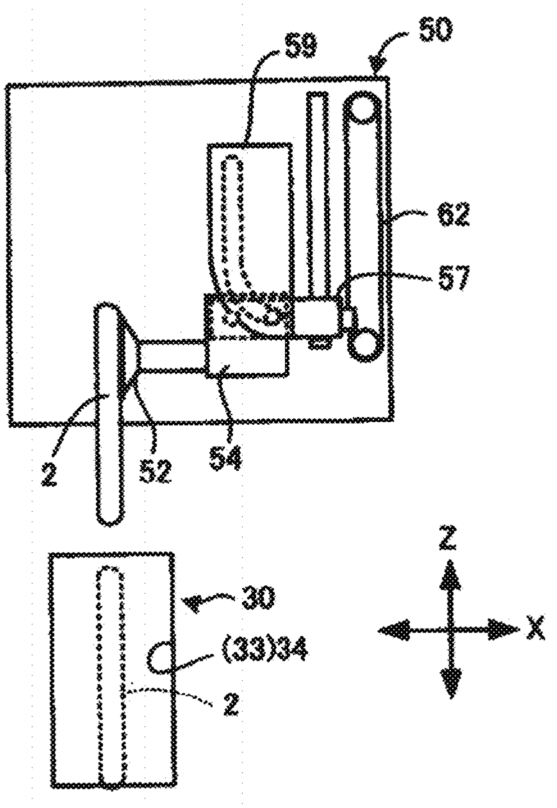

Next, the carriage 50 is slightly moved from the position of FIG. 12A to the right side in the X direction, as illustrated in FIG. 12B, by the transporting device 90 of FIGS. 1A and 1B, and is stopped in a position at which the taken out pack 2 can be inserted into the predetermined compartment box 34 (or the predetermined section 33) of the same medicine dispensing tray 30. Once the carriage 50 is moved to the position substantially immediately above the predetermined compartment box 34 (or the predetermined section 33) of the medicine dispensing tray 30 into which the pack 2 can be inserted, the negative pressure generator 45 is driven for a short period to generate a pressure (positive pressure) from the negative pressure. As a result, a pressurized air flow is blown out from the suction pads 52 to the pack 2 so that the suction state of the pack 2 is released to insert the pack 2 into the predetermined compartment box 34 (or the predetermined section 33) of the medicine dispensing tray 30 (see FIG. 12C).

The above operation is performed a few times to insert intended packs 2 into the predetermined sections 33 of the medicine dispensing tray 30, followed by ejecting the medicine dispensing tray 30 from the device through the third access opening 43 (see FIGS. 1A and 1B) to be received by a medication supporter, such as a staff member of a care facility.

The operation of reading the QR code (registered trademark) of the medication associated information 6*c* of the cartridge 10 illustrated in FIGS. 6A and 6B with the upper reader 66*a* of the upper QR code reader 66 of FIGS. 9A and 9B will be described with reference to FIG. 13. The cartridge 10 illustrated in FIGS. 6A and 6B is identical to the cartridge 10 illustrated in FIGS. 5A and 5B, except that the display position of the QR code (registered trademark) of the medication associated information 6*c* is changed from the pouch portion 2*a* of the pack 2 to the bottom wall surface of the left support 13 of the cartridge 10.

Figure 13:
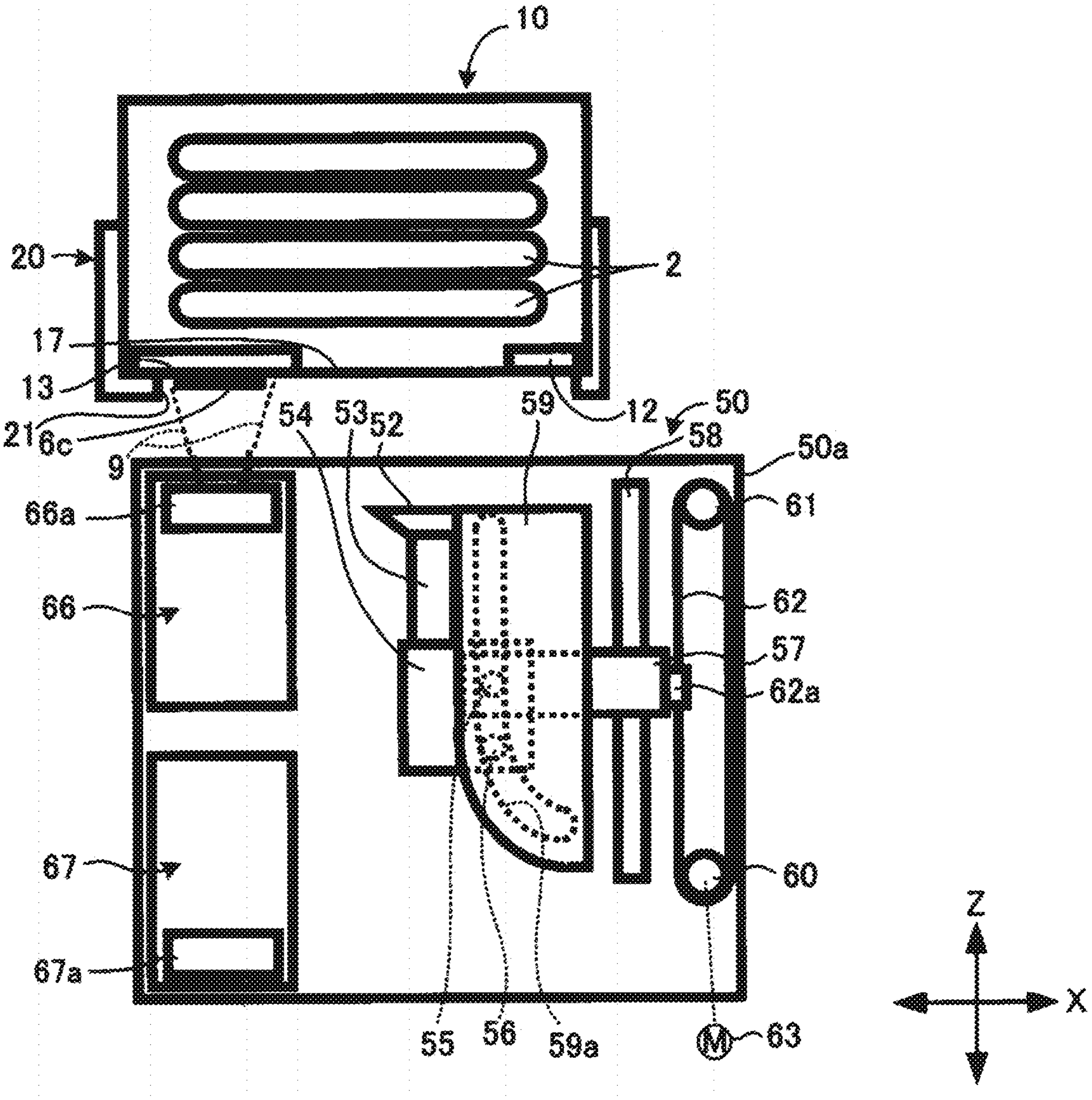
FIG. 13 is a front view illustrating an example of an operation of reading medication associated information depicted on the cartridge.

In order to read the QR code (registered trademark) of the medication associated information 6*c* depicted on the bottom wall surface of the left support 13 of the cartridge 10, as illustrated in FIG. 13, the carriage 50 can be moved to the left side in the X direction to a position in a reading range 8 in which the upper reader 66*a* in the upper QR code reader 66 of the carriage 50 can read the QR code (registered trademark) of the medication associated information 6*c* depicted on the bottom wall surface of the left support 13 of the cartridge 10. In the state where the carriage 50 is in the above position, the upper reader 66*a* of the upper QR code reader 66 reads the QR code (registered trademark) of the medication associated information 6*c* depicted on the bottom wall surface of the left support 13 of the cartridge 10. The actions of the carriage 50 other than the above are the same as the description of FIGS. 11A to 11F and FIGS. 12A to 12C.

As described above, according to the above embodiment, the carriage 50 is positioned below the cartridge 10 and the cartridge tray 20 when a pack 2 is taken out from the cartridge 10, and the pack 2 is taken out from the bottom side of the cartridge 10. Since the pack 2 is taken out from the bottom side of the cartridge 10, the subsequent pack 2 is automatically moved downward (toward the pack discharging opening 17) by the weights of the packs 2 remaining in the cartridge 10 and the movable plate 16. Therefore, the carriage 50 can perform the same operation with a simple configuration regardless of the remaining amount of the packs 2 in the cartridge 10.

Figure 14A:
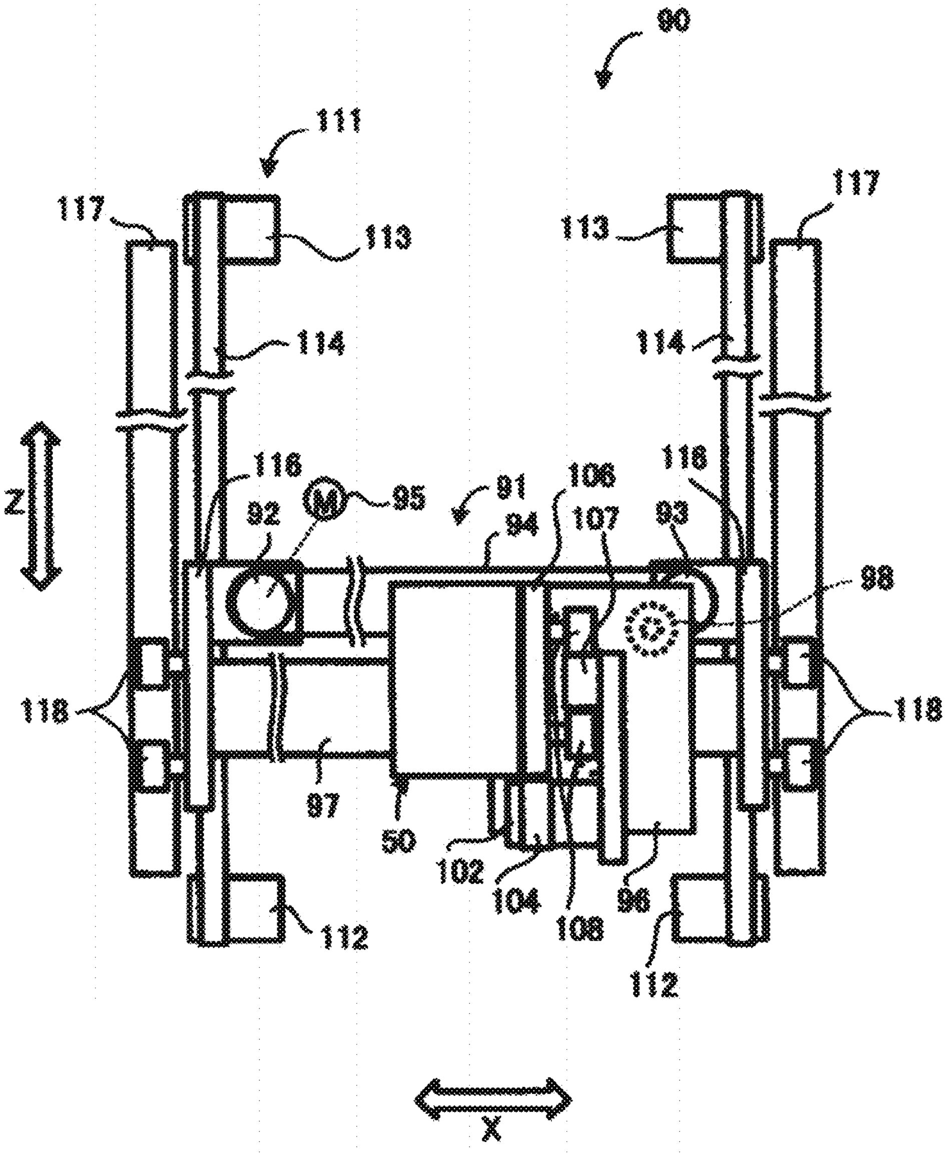
FIG. 14A is a front view illustrating an example of a configuration of a main part of a transporting device.
Figure 14B:
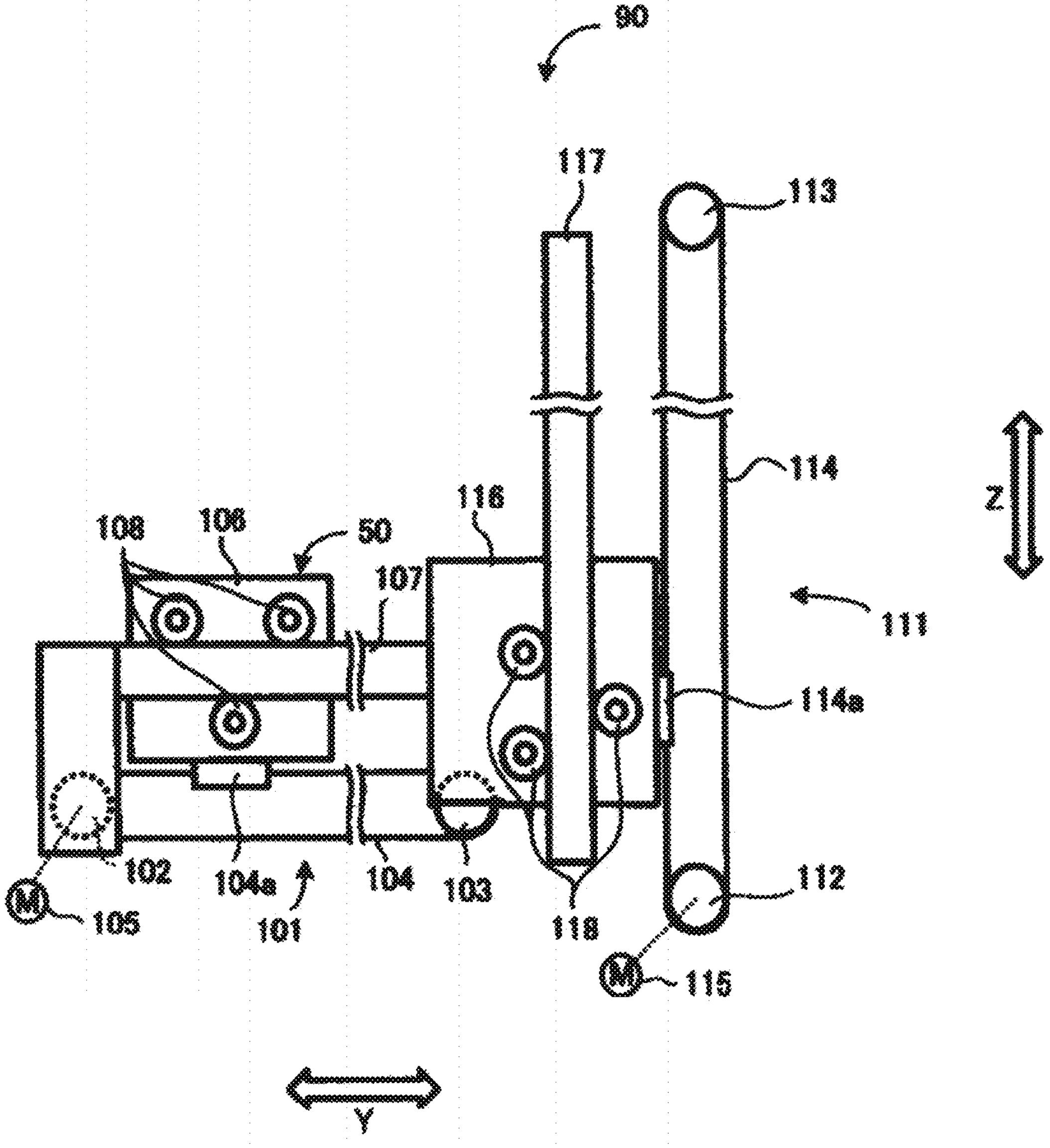
FIG. 14B is a side view of FIG. 14A.

The configuration and operation of the transporting device 90 will be described with reference to FIGS. 14A and 14B. FIG. 14A is a front view illustrating an example of a main configuration of the transporting device. FIG. 14B is a side view of FIG. 14A. Similar to the configuration of the medicine dispenser 200 of FIGS. 1A and 1B, the cartridges 10 are arranged on a plane below the medicine dispensing tray 30 disposed at the uppermost portion of the main body frame 199 in the Z direction, and the medicine dispensing tray 30 is further above the upper cartridge 10, and therefore, the carriage 50 is configured to move in three directions of the X direction, the Y direction, and the Z direction. As described above, the transporting device 90 is configured to move the carriage 50 in the X direction, the Y direction, and the Z direction to transport the carriage 50 to pass the pack 2 taken out from the cartridge 10 to the medicine dispensing tray 30.

A mechanism for moving carriage 50 in the X direction is an X-direction transporting mechanism 91, a mechanism for moving the carriage 50 in the Y direction is a Y-direction transporting mechanism 101, and a mechanism for moving the carriage 50 in the Z direction is a Z-direction transporting mechanism 111. The X-direction transporting mechanism 91, the Y-direction transporting mechanism 101, and the Z-direction transporting mechanism 111 have similar configurations.

The X-direction transporting mechanism 91 includes an X adaptor 96 attached to the carriage 50, an X guide member 97 configured to guide the carriage 50 in the X direction via the X adaptor 96, an endless belt 94 suspended around and supported by a drive pulley 92 and a driven pulley 93, and a drive motor 95 for transporting in the X direction coupled to the drive pulley 92 via a driving force transmission member, such as a gear and a belt. Three rollers 98 (two of the three rollers are not visible as being hidden by the carriage 50) are attached to the X adaptor 96 in a manner such that the roller 98 can be rolled with the X guide member 97 being interposed between the rollers 98. Moreover, the X adaptor 96 is joined with and fixed to the endless belt 94 via a belt grip (not illustrated).

According to the above configuration of the X-direction transporting mechanism 91, as the drive motor 95 is driven, the driving force is transmitted to the endless belt 94 via the drive force transmission member and the drive pulley 92 to rotate the endless belt 94 so that the carriage 50 moves in the X direction along the X guide member 97 together with the X adaptor 96.

The Y-direction transporting mechanism 101 includes a Y adaptor 106 attached to the carriage 50, a Y guide member 107 configured to guide the carriage 50 in the Y direction via the Y adaptor 106, an endless belt 104 suspended around and supported by a drive pulley 102 and a driven pulley 103, and a drive motor 105 for transporting in the Y direction coupled to the drive pulley 102 via a driving force transmission member, such as a gear and a belt. Three rollers 108 are attached to the Y adaptor 106 in a manner such that the rollers 108 can be rolled with the Y guide member 107 being interposed between the rollers 108. Moreover, the Y adaptor 106 is joined with and fixed to the endless belt 104 via a belt grip 104*a*.

According to the above configuration of the Y-direction transporting mechanism 101, as the drive motor 105 is driven, the driving force is transmitted to the endless belt 104 via the driving force transmission member and the drive pulley 102 to rotate the endless belt 104 so that the carriage 50 moves in the Y direction along the Y guide member 107 together with the Y adaptor 106.

The Z-direction transporting mechanism 111 includes a pair of Z adaptors 116 attached to the both ends of the X guide member 97 in the X direction, a pair of Z guide members 117 configured to guide the carriage 50 in the Z direction via the X guide member 97 and the pair of Z adaptors 116, an endless belt 114 suspended around and supported by a drive pulley 112 and a driven pulley 113, and a drive motor 115 for transporting in the Z direction coupled to the drive pulley 112 via a driving force transmission member, such as a gear and a belt. In a set of the Z-direction transporting mechanism 111, the drive pulley 112, the driven pulley 113, and the endless belt 114 is disposed at the both sides in the X direction, but the drive motor 115 is disposed at only one of the drive pulleys 112. Three rollers 118 are attached to each Z adaptor 116 in a manner such that the rollers 118 can be rolled with the Z guide member 117 being interposed between the rollers 118. Moreover, each of the Z adaptors 116 is joined with and fixed to a corresponding endless belt 114 via a corresponding belt grip 114*a*.

According to the above configuration of the Z-direction transporting mechanism 111, as the drive motor 115 is driven, the driving force is transmitted to the endless belt 114 via the driving force transmission member and the drive pulley 112 to rotate the endless belt 114 so that the carriage 50 moves in the Z direction along with the Z guide member 117 together with the X guide member 97 and the Z adaptor 116.

In FIGS. 14A and 14B, the carriage 50 is configured to move in three axial directions of the X axis, Y axis and Z axis. However, in a case where the cartridge 10 is disposed above the carriage 50 and the medicine dispensing tray 30 is disposed below the carriage 50 with the carriage 50 being interposed between the cartridge 10 and the medicine dispensing tray 30, for example, the carriage 50 may be moved only in the X direction and the Y direction, and therefore, the number of moving axes can be reduced by one.

As described above, the embodiment of the present disclosure has a configuration in which two QR code readers, i.e., the upper QR code reader 66 including the upper reader 66*a* and the lower QR code reader 67 including the lower reader 67*a*, are disposed as the QR code reader serving as the pack information reader. However, one QR code reader may be disposed as the pack information reader.

The operation of reading the QR code (registered trademark) may be controlled to detect attachment of the cartridge or medicine dispensing tray, or both to start reading automatically, as described below. Moreover, the reading may be performed immediately before taking a medicine pack from the cartridge, or immediately before dispensing a medicine pack to the medicine dispensing tray. Alternatively, the reading may be appropriately set through an operation of a user. A method of performing the operation of reading is not particularly limited.

The QR code (registered trademark) on the carriage side and the QR code (registered trademark) on the medicine dispensing tray (compartment box) side are read, and information from each reading is stored to use for data comparison at the time of medicine dispensing (see FIG. 16 below).

A control configuration of the medicine dispenser 200 will be described with reference to FIG. 15. FIG. 15 is a block diagram depicting an example of a main control configuration of the medicine dispenser. As illustrated in FIG. 15, the medicine dispenser 200 includes a central processing unit (CPU) serving as a control unit 150. The CPU as the control unit 150 is a controller configured to control an operation of each of the members, devices, or mechanisms of the medicine dispenser 200. The CPU includes a memory 152, a timer 153, etc. The CPU instructs to notify a staff member or operate a device at the timing according to the program based on various inputs including signals from sensors described below.

The CPU may have, in addition to calculation and control functions, a timer (timekeeping) function. The memory 152 of the control unit 150 includes a random access memory (RAM) also referred to as a main memory device (main memory) and a read only memory (ROM). The programs readable by the CPU (e.g., programs, such as the control-flowchart described below) and various data are stored in the ROM in advance. The various data includes, for example, data on the relationship between sections 33 of the medicine dispensing tray 30 or a plurality of compartment boxes 34 allocated for each individual taking medication and the medicine packs, data on the relationship between the sections 33 of the medicine dispensing tray 30 or the compartment boxes 34 allocated for each administration timing and the medical packs, data on the relationship between the sections 33 of the medicine dispensing tray 30 or the compartment boxes 34 allocated according to the order of the medication and the medicine packs, etc.

As a user interface, a touch panel controller 151 is electrically connected to the input/output port of the CPU. The touch panel controller 151 is not limited to the above example. For example, the input portion and the display portion may be separate components, and may be a combination of a keyboard and a LED display panel.

As various sensors, for example, a medicine dispensing tray detection sensor 156 and a cartridge detection sensor 157 may electrically couple to the input ports of the CPU. The medicine dispensing tray detection sensor 156 is configured to detect a type of the medicine dispensing tray 30 housed in the device, or the presence or absence of the medicine dispensing tray 30. The cartridge detection sensor 157 is configured to detect the presence or absence of the cartridge 10. As various sensors, moreover, drawer access opening opening/closing sensors 159*a* and 159*b* configured to detect opening and closing of the first access opening 41 and the second access opening 42, and medicine dispensing tray access opening opening/closing sensors 160*a* and 160*b* configured to detect opening and closing of the third access opening 43 and the fourth access opening 44 are electrically coupled to the input ports of the CPU. The medicine dispensing tray detection sensor 156, the cartridge detection sensor 157, the drawer access opening opening/closing sensors 159*a* and 159*b*, and the medicine dispensing tray access opening opening/closing sensors 160*a* and 160*b* are illustrated only in FIG. 15.

Moreover, a HP sensor 99 serving as a HP sensor X configured to detect a home position (abbreviated as "HP"

hereinafter) of the X-direction transporting mechanism 91 of the carriage 50, a HP sensor 109 serving as a HP sensor Y configured to detect a HP of the Y-direction transporting mechanism 101 of the carriage 50, and a HP sensor 119 serving as a HP sensor Z configured to detect a HP of the Z-direction transporting mechanism 111 of the carriage 50 are electrically coupled to the input ports of the CPU. Further, a HP sensor 158 serving as a HP sensor P configured to detect a HP of the suction member 51 (particularly the suction pads 52) of the carriage 50 is electrically coupled to the input port of the CPU.

The upper QR code reader 66 (upper reader 66*a*) serving as the medication associated information reader 65 disposed in the carriage 50, and the lower QR code reader 67 (lower reader 67*a*) serving as the medication associated information reader 65 are electrically coupled to the input ports of the CPU.

As one example of a storing detector configured to detect attachment or detachment of the cartridge 10 to the main body frame 199 of the medicine dispenser 200, a cartridge detection sensor 70 is electrically coupled to the input port of the CPU. The storing detector, the cartridge detection sensor 70, etc., will be described below.

The drive motor 95 of the X-direction transporting mechanism 91, the drive motor 105 of the Y-direction transporting mechanism 101, the drive motor 115 of the Z-direction transporting mechanism 111, and the drive motor 63 for changing the orientation of the suction pad 52 are electrically coupled to the output ports of the CPU via various motor drivers X to Z and P 162-165, respectively. Moreover, the negative pressure generator (ejector valve) 45, which is an actuator for the negative pressure generator, is electrically coupled to the output port of the CPU via a driver for the negative pressure generator 166. A notification device may be electrically coupled to the output port of the CPU. The notification device is configured to notify a state of the above device, mechanisms, or members through light (e.g., LEDs), sound including voices, or vibrations. The notification device may include a speaker or a light that notifies the administration timing, even when a staff member etc. is away from the device (medicine dispenser).

The external medicine information 161 may be also input to the CPU via the I/O, stored in the memory 152, and used for allocation of medicines to an individual taking medication. The LEDs 25*a*1 to 25*d*5 of the drawer 80 may be electrically coupled.

Once input information from the touch panel controller 151 and various signals from various HP sensors 99, 109, 119, and 158, and other various sensors (not illustrated) are input into the CPU, the CPU outputs the following command signals. Specifically, the CPU is configured to output command signals to the audio device or light device of the display device (including the above notification device) of the touch panel controller 151, the LEDs 25*a*1 to 25*d*5, the negative pressure generator 45, the drive motor 63, the drive motor 95, the drive motor 105, the drive motor 115, and drivers corresponding to the LEDS.

The drive motor 63 outputs via the HP sensor 158 serving as the HP sensor P and the motor driver P is used to drive and control the suction-member lifting mechanism. The CPU has a function of causing to perform each of control operations described in the description or control-flowchart below.

The control configuration of the medication assistance device of the present disclosure will be described with reference to FIG. 16. FIG. 16 is a block diagram depicting an example of a control of the medication assistance device of the present disclosure. As illustrated in FIG. 16, the medication assistance device 300 of the present disclosure includes the above-described medicine dispenser 200 and a personal computer (abbreviated as "PC" hereinafter) 210 coupled to the medicine dispenser 200 so that the medicine dispenser 200 and the PC 210 can communicate with (transmit to and receive from) each other. The PC 210 is made up of five devices available in the related art. Specifically, the PC 210 includes a control device, an arithmetic device, a memory device, an input device, and an output device. The control device includes a CPU and is configured to execute a program or output commands to other devices. The arithmetic device is configured to execute a program or perform calculations. The memory device includes a main storage device and an auxiliary storage device, and stores data, such as programs and texts. The input device includes a mouse, a keyboard, a microphone, etc., and is configured to transmit data or commands to the computer. The output device includes a display, a printer, a speaker, etc., and is configured to output the data from the computer.

The PC 210 enhances functions of the medicine dispenser 200, and exhibits a function of a host computer that is set to solve the above-described problems to be solved by the present disclosure, including various problems that may possibly occur, and manages and assists the medicine dispenser 200. The PC 210 is communicated with a pharmacy etc. supplying medicines via a network line (not illustrated).

The pack information management system 212 set in the management application 211 is configured to read and manage medication associated information of medicine packs. Moreover, the medicine dispensing information management system 213 set in the management application 211 is configured to read and manage medicine dispensing information including at least a name of an individual taking medication and administration timing.

For example, the pack information management system 212 and the medicine dispensing information management system 213 may be realized as the management application 211 in the PC 210. As illustrated in FIG. 16, the medicine dispenser 200 and the PC 210 may constitute a system that manages through communication with the medicine dispenser 200. The management application 211 is configured to load a medicine dispensing information file 219 that is externally generated (for example, in a pharmacy where medicines are supplied based on a prescription issued by a doctor) and includes medicine information for each individual taking medication, administration timing, etc. Moreover, the management application 211 is configured to load the data input from the setting file 217 in which set information that has been set once in the PC 210 is recorded.

The data output from the management application 211 as appropriate may include a file output as a log file according to changed contents, a medical dispensing history file 215 in which a medicine dispensing history is collected. Further, each form 218 is output from the PC 210 via the management application 211 as appropriate. The functions of the PC 210, such as the management application 211 may be provided in the medicine dispenser 200.

Specifically, the medicine dispensing information management system 213 has the following effect. That is, the medicine dispensing information management system 213 stores the results or change history as records, and stores the results of actual medicine dispensing as traceability information to review when a problem occurs.

The pack information management system 212 is configured to manage the medication associated information including at least a name of an individual taking medication and administration timing. The operation of the above-described medicine dispenser 200 will be additionally described as follows. As illustrated in FIG. 9, the upper QR code reader 66 and the lower QR code reader 67 are mounted on the carriage 50 of the medicine dispenser 200. The carriage 50 is moved to the vicinity of the cartridge 10 in which the medicine pack (e.g., the unit-dose medicine pack 2 and the pack bundle 2A) is stored so that the QR code (registered trademark) of the medication associated information 6*c* can be read by the upper reader 66*a* of the upper QR code reader 66.

In the case where the medication associated information 6*c* is depicted on a surface of the medicine pack as illustrated in FIGS. 5A and 5B, the QR code (registered trademark) is revealed from the pack discharging opening 17 as illustrated in FIG. 10, thus the QR code (registered trademark) can be read by the upper reader 66*a* of the upper QR code reader 66. In the case where the medication associated information 6*c* is depicted on the bottom wall surface of the left support 13 of the cartridge 10 as illustrated in FIG. 13, the position where the medication associated information 6*c* is depicted is the pack discharging opening 17, thus the QR code (registered trademark) of the medication associated information 6*c* can be read by the upper reader 66*a* of the upper QR code reader 66 in the similar manner as the above.

In the case where the carriage 50 moves to a position above the compartment box 34 of the medicine dispensing tray 30, while retaining the pack 2 taken out from the cartridge 10, as illustrated in FIG. 12A, the QR code (registered trademark) of the medication associated information 6*c* can be read by the lower reader 67*a* of the lower QR code reader 67 in the similar manner as the above. The information read by the upper QR code reader 66 or the lower QR code reader 67 in the above-described manner is transmitted to the pack information management system 212 in the PC 210 via a communication module 214.

Figures 1, 18A:
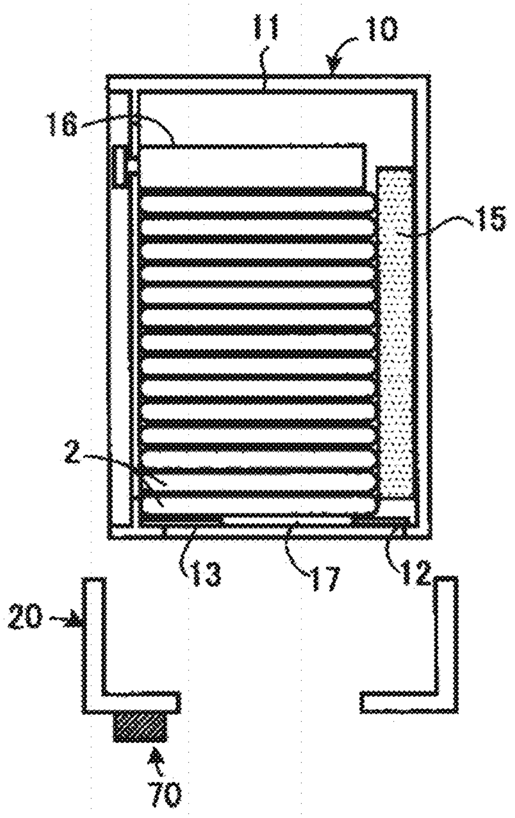
FIGS. 18A-1 and 18B-1 are views illustrating an example of a cartridge tray on which the cartridge is not set.

Since the upper QR code reader 66 and the lower QR code reader 67 are mounted on the carriage 50, a name of an individual taking medication and a position of the cartridge 10 in which medicine packs to be administered by the individual taking medication can be detected by moving the carriage 50 within the medicine dispenser 200 (see FIG. 1). Specifically, when the position coordinates (e.g., X: row, Y: column, Z: stage) of the cartridge 10 corresponding to the position of the cartridge 10 in the medicine dispenser 200 is read through the QR code (registered trademark) of the cartridge 10 using the upper QR code reader 66, the position coordinates of the carriage 50 corresponding to the position of the cartridge can be linked with the QR code (registered trademark) of the medication associated information 6*c*.

If a user takes a medicine pack directly from the cartridge or replenish the cartridge with medicine packs, the medication associated information read by the upper QR code reader 66 or the lower QR code reader 67 may become uncertain information. Therefore, in the worst case, medicines may be erroneously dispensed, which causes a serious problem, unless the medication associated information is updated. When medicines are dispensed after the power source of the medicine dispenser 200 is turned on or off, or after the medicines are dispensed once, there is a possibility that the cartridge may be replaced. In such case, it is important to read the medication associated information again.

However, in a case where there are a large number of cartridges, it takes a long time to read medication associated information of all cartridges every time medicines are dispensed, which increases a duration for dispensing medicines.

Therefore, attachment or detachment of the cartridge (may be referred to as "replacement") is detected by a sensor, and medication associated information of the cartridges which have been inserted or removed is read again so that a reading time can be significantly shortened.

Figure 17A:
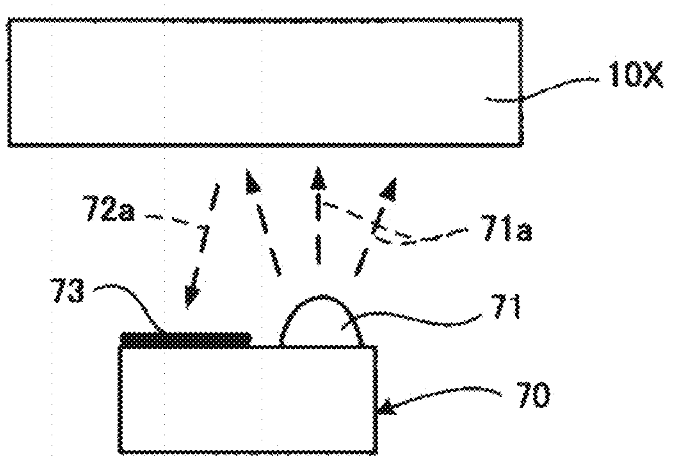
FIGS. 17A to 17C are schematic views illustrating an example of a cartridge detection sensor configured to detect attachment or detachment (replacement) of the cartridge.
Figure 17B:
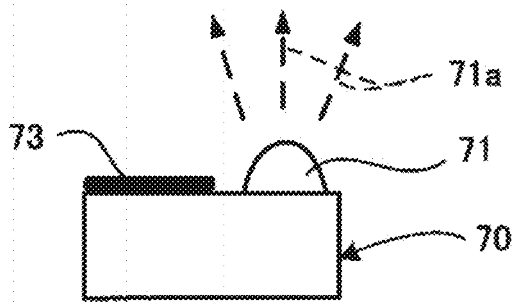

A principle of detection of attachment or detachment (replacement) of a cartridge by a sensor will be described with reference to FIGS. 17A to 17C. FIGS. 17A and 17B are schematic views illustrating a cartridge detection sensor 70 configured to detect attachment or detachment (replacement) of a cartridge. As illustrated in FIG. 17A, it is assumed that a cartridge 10X is a detection target, and the cartridge 10X is detected by an optical sensor (e.g., a reflective photosensor) as a storing detector. The optical sensor constituting the cartridge detection sensor 70 emits detection light 71*a* from a light emitter 71. When the cartridge 10X is present, reflected light 72*a* from the cartridge 10X is received by a receiver 73 to detect the presence or absence of the cartridge 10X that is the detection target. In a case where the cartridge 10X that is a detection target is not present as illustrated in FIG. 17B, reflected light of the detection light 71*a* does not enter the receiver 73 so that the absence of the cartridge 10*x* that is the detection target can be detected.

Figure 17C:
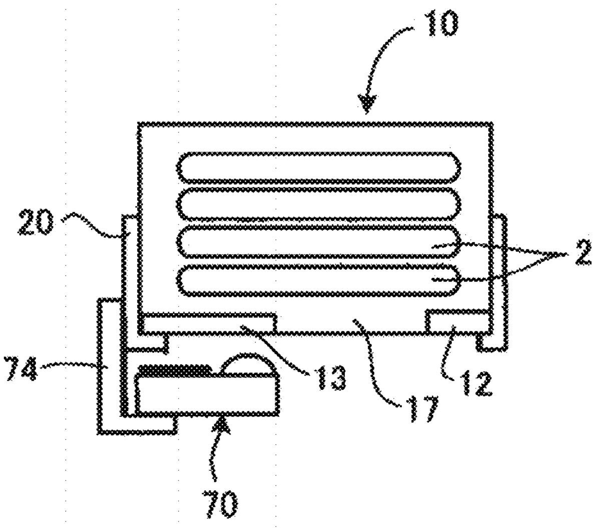

The cartridge detection sensor 70 including the above-described optical sensor is disposed on the cartridge tray 20 (for example, fixed via a mounting plate 74) as illustrated in FIG. 17C, attachment or detachment (replacement) of the cartridge 10 can be detected. When the cartridge detection sensor 70 is disposed on the cartridge tray 20, it is needless to say that the cartridge detection sensor 70 is disposed via the mounting plate 74 at a position where the disposed cartridge detection sensor 70 does not interfere with the carriage 50 etc. during the reading operation of the upper reader 66*a* of the upper QR code reader 66 illustrated in FIGS. 10 and 13.

Other than the above optical sensor, the cartridge detection sensor 70 may employ an embodiment where a distance sensor is used to detect a change in the distance to the cartridge 10 to detect attachment or detachment (replacement) of the cartridge 10, or an embodiment where a weight sensor is used to detect a change in weight of the cartridge 10 to detect attachment or detachment (replacement) of the cartridge 10. Moreover, the cartridge detection sensor 70 is not limited to the optical sensor, the distance sensor, and the weight sensor, and may be a push button switch etc. configured to be in contact with the cartridge 10 to detect attachment or detachment (replacement) of the cartridge 10.

Figures 2, 18A:
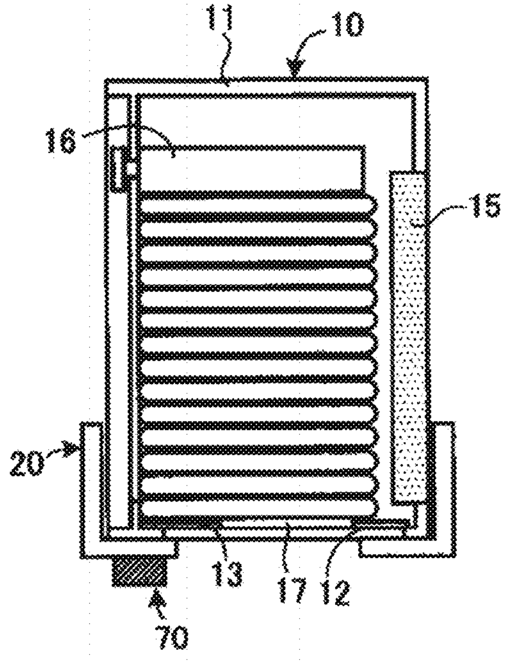
Figures 1, 18B:
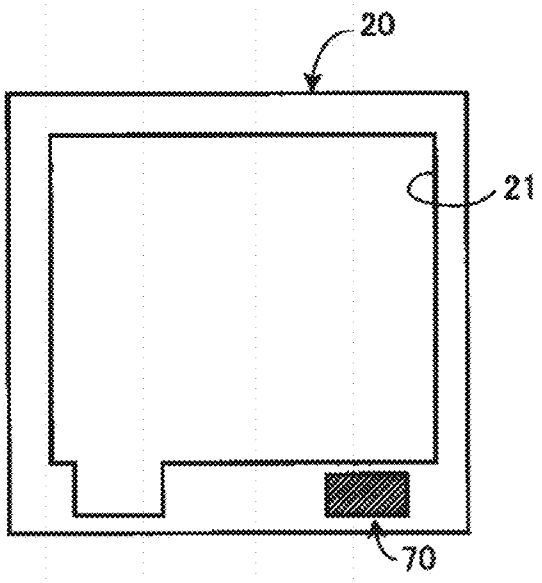
Figures 2, 18B:
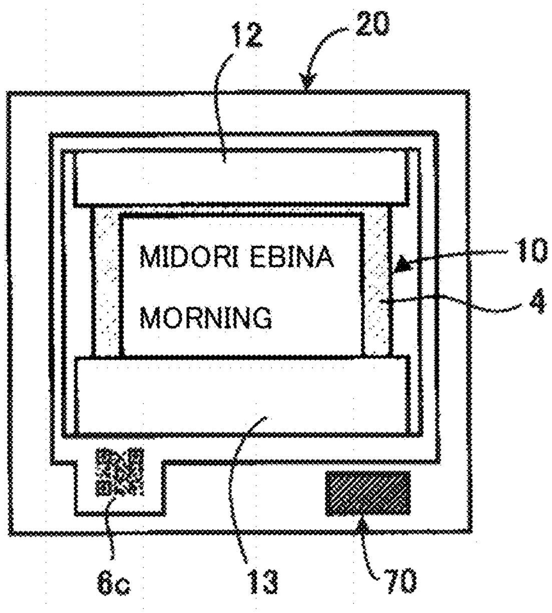
Figure 19:
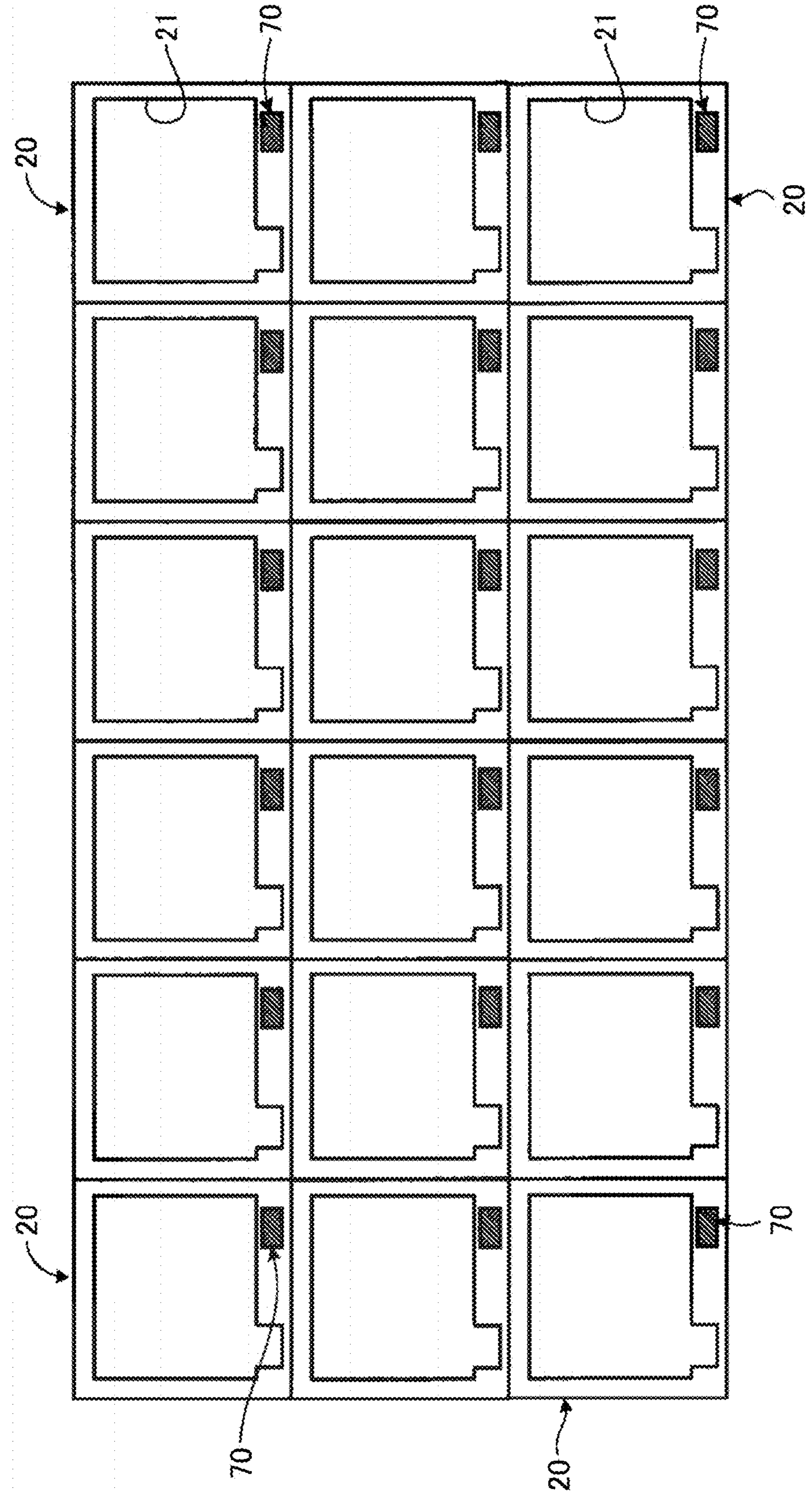
FIG. 19 is a bottom view illustrating an example of a plurality of cartridge trays to each of which a cartridge detection sensor is disposed.

An embodiment in which attachment or detachment (replacement) of cartridges 10 detected by cartridge detection sensors 70 respectively disposed at the cartridges 10 will be described with reference to FIGS. 18A-1 to 18B-2 and 19. Each of the cartridge detection sensors 70 is composed of an optical sensor. FIGS. 18A-1 and 18B-1 are views illustrating a cartridge tray 20 in which a cartridge 10 has not been set. FIGS. 18A-2 and 18B-2 are views illustrating the cartridge tray 20 in which the cartridge 10 is set. FIG. 18A-1 is a cross-sectional view illustrating the surrounding of the cartridge tray 20 in which the cartridge 10 has not been set, and FIG. 18B-1 is a bottom view of the cartridge tray 20 in which the cartridge 10 has not been set. FIG. 18A-2 is a cross-sectional view illustrating the surrounding of the cartridge 10 and the cartridge tray 20 in a state in which the cartridge 10 is set on the cartridge tray 20, and FIG. 18B-2 is a bottom view of the cartridge 10 and the cartridge tray 20 in a state in which the cartridge 10 is set on the cartridge tray 20. FIG. 19 is a bottom view illustrating a plurality of cartridge trays 20 in each of which the cartridge detection sensor 70 is disposed.

Once the cartridge 10 is mounted and set on the cartridge tray 20 as illustrated in FIGS. 18A-2 and 18B-2, the cartridge detection sensor 70 disposed on the bottom outer surface of the cartridge tray 20 detects and reacts to the bottom surface of the cartridge 10 to detect that the cartridge 10 is mounted and set on the cartridge tray 20.

Since the cartridge detection sensor 70 is disposed on the cartridge tray 20 as described above, insertion or removal of each cartridge 10 with respect to each cartridge tray 20 can be confirmed. As illustrated in FIG. 19, the cartridge trays 20 may be linked together.

In the embodiment illustrated in FIG. 19, insertion or removal of the cartridge is detected for each cartridge to accurately detect the cartridges which have been operated. On the other hand, there may be problems such that a cost may increase as a sensor is disposed for each cartridge, and it is necessary to provide the electrical wiring of the storing detector (e.g., the cartridge detection sensor 70) for each cartridge detection sensor 70.

Figure 20A:
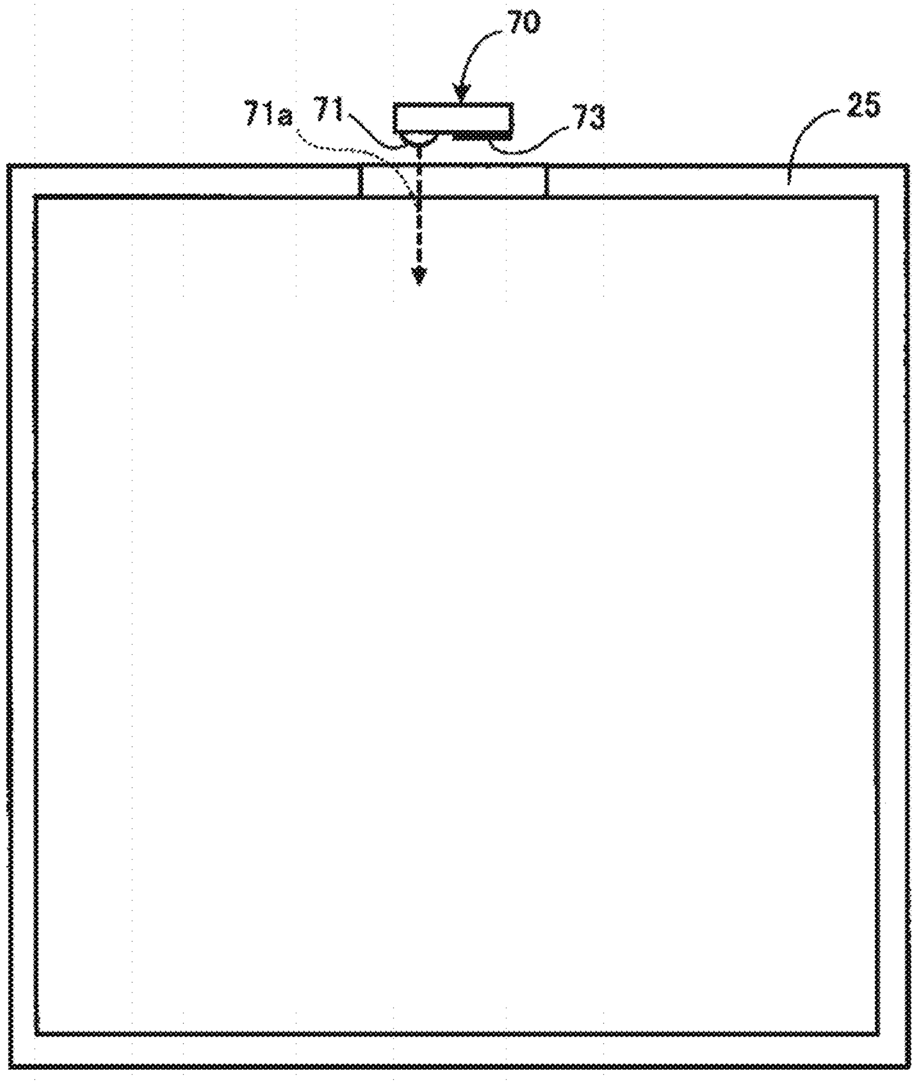
FIG. 20A is a view illustrating an example of an operation of detecting that a cartridge assembly, in which a plurality of cartridges are assembled on a cartridge tray setting portion, is not mounted (not set) using the cartridge detection sensor.
Figure 20B:
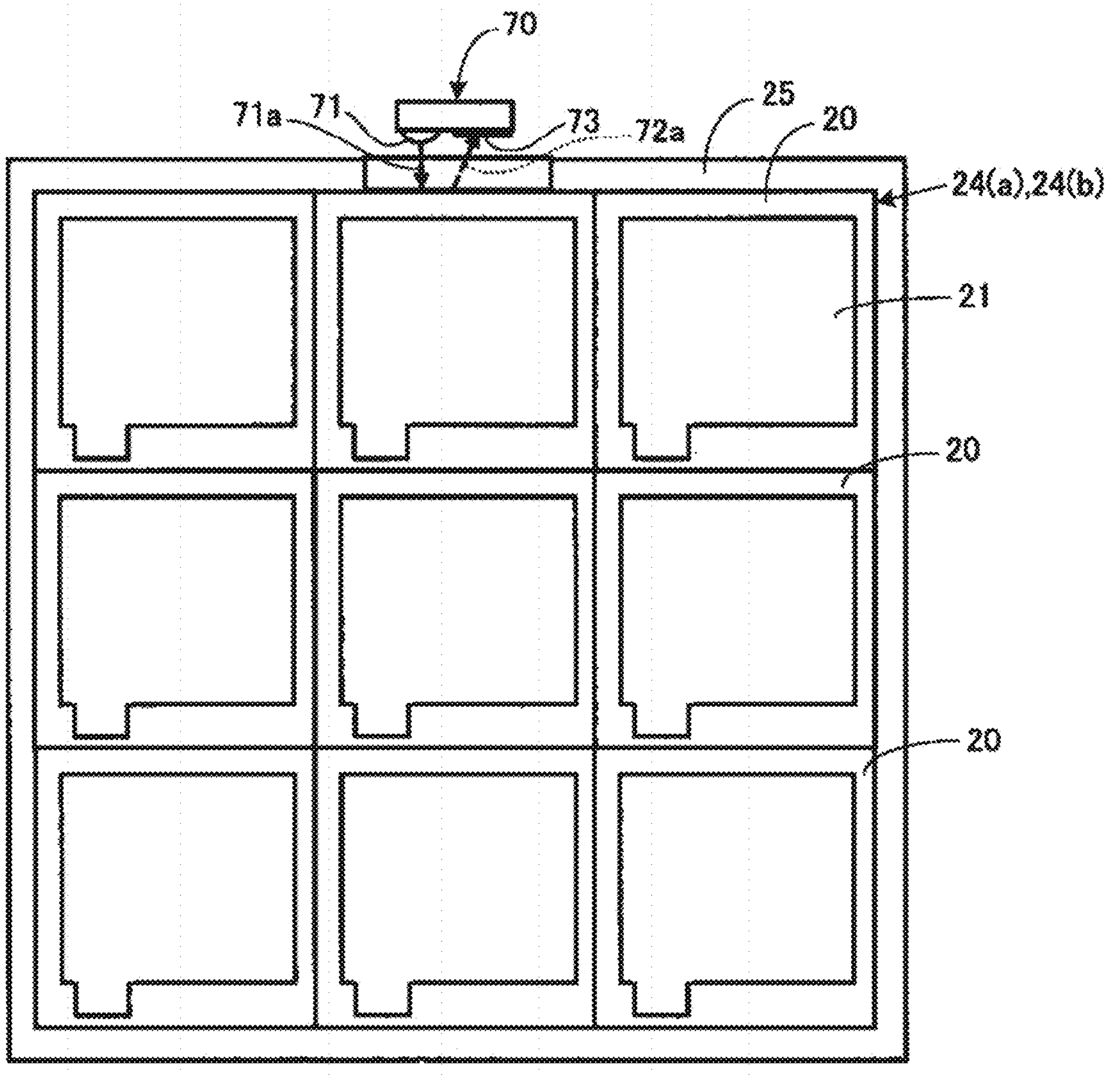
FIG. 20B is a view illustrating an example of an operation of detecting that the cartridge assembly is mounted (set) on the cartridge tray setting portion using the cartridge detection sensor.

An embodiment in which a storing detector configured to detect attachment or detachment states of storing members collectively is disposed will be described with reference to FIGS. 20A, 20B, and 21. FIG. 20A is a view illustrating an example of an action of detecting a state a cartridge assembly 24 has not been set in a cartridge tray setting portion 25 using a cartridge detection sensor 70, where the cartridge assembly 24 is an integrated structure formed of a plurality of cartridges as illustrated in FIG. 20B. FIG. 20B is a view illustrating an example of an action of detecting a state the cartridge assembly 24 is mounted (set) in the cartridge tray setting portion 25 using the cartridge detection sensor 70.

The cartridge assembly 24 illustrated in FIG. 20B is an integrated structure formed of a plurality of cartridges (nine cartridges in total in FIG. 20B), and is attached to or detached from the cartridge tray setting portion 25.

As illustrated in FIG. 20A, the cartridge detection sensor 70 is disposed on the cartridge tray setting portion 25. Once the cartridge assemblies 24 (*a*) and 24 (*b*) are set in the medicine dispenser 200 illustrated in FIG. 21, setting of the cartridge assembly's 24 (*a*) and 24 (*b*) is detected. As the storing detector, a sensor similar to the cartridge detection sensor 70 may be used.

Figure 21:
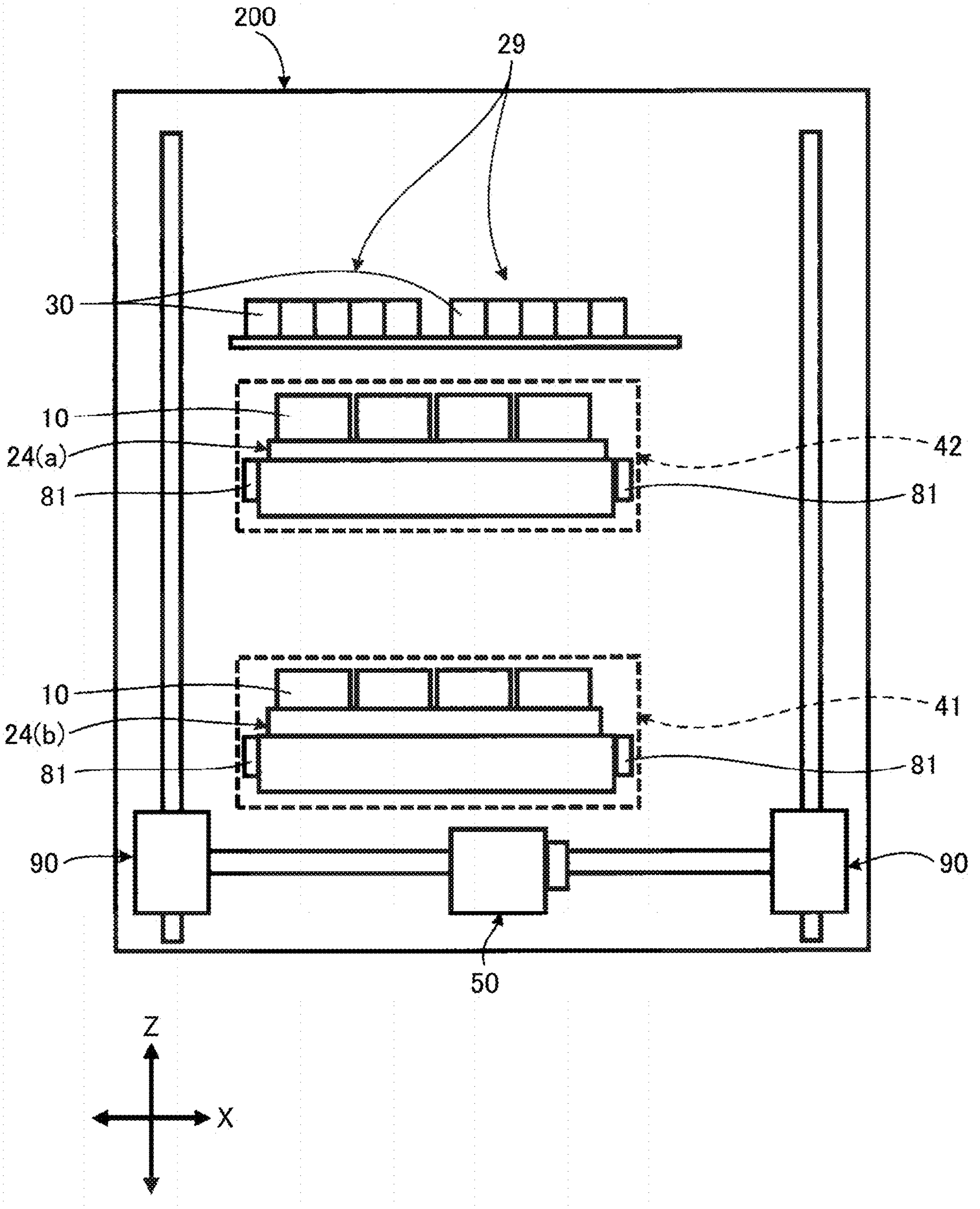
FIG. 21 is a view illustrating an embodiment in which a medicine dispenser is configured to perform the management separately for each cartridge tray.

The medicine dispenser 200 of FIG. 21 demonstrates the embodiment where the management is arranged for each cartridge tray. Specifically, the management is divided into two, the cartridge assembly 24 (*a*) and the cartridge assembly 24 (*b*). If the cartridge assembly 24 (*a*) is inserted or removed, only the information of the cartridge assembly 24 (*a*) may be confirmed again (checking insertion or removal of the cartridge assembly 24 (*a*) by the cartridge detection sensor 70 and reading of medication associated information 6*c* by the upper reader 66*a* of the upper QR code reader 66).

In the embodiment illustrated in FIGS. 20A to 20B, and 21, insertion or removal with respect to the cartridge tray setting portion 25 is detected by the cartridge detection sensor 70 per the cartridge tray unit (cartridge assembly 24 (*a*) or 24 (*b*)), not the cartridge unit, thus the detection can be performed at a minimum cost.

Figure 22:
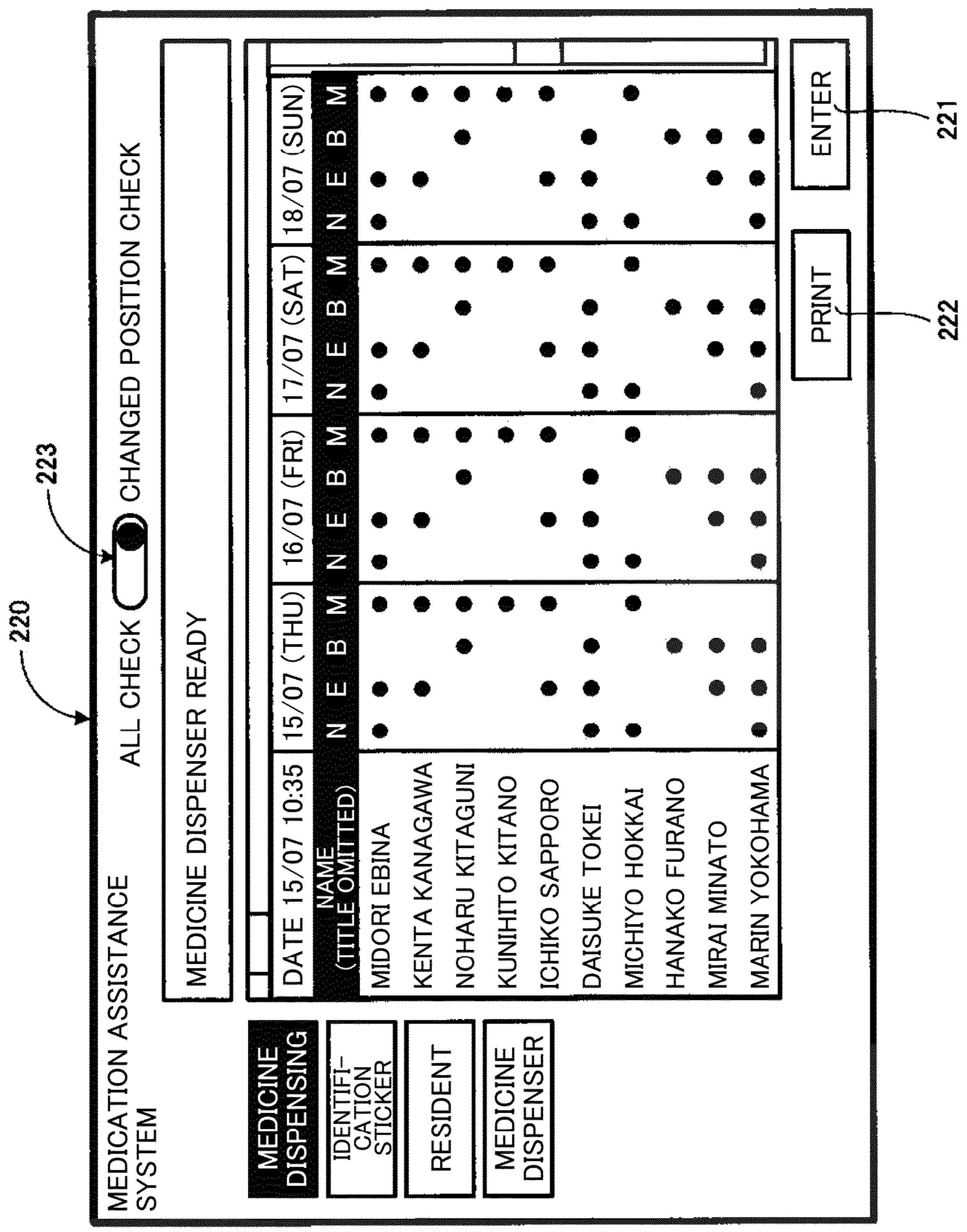
FIG. 22 is a view illustrating an example of an operation screen of a management application.

FIG. 22 is a view illustrating an example of an operation screen of the management application. In some cases, it may desirable for a user to update information of all cartridges every time, in addition to updating information of only the changed cartridges, from the viewpoint of safety. Therefore, the management application illustrated in FIG. 22 has a function of switching between checking of all cartridges and checking of only changed cartridges, thus a user can select the mode as appropriate. In a case where only the changed cartridges are checked, for example, a black button displayed at the top of the operation screen of the management application of FIG. 22 is moved to the side of "changed position check" column by a drag operation using a mouse or using 4-direction arrow keys, followed by pressing the execution button 221 to select.

When the safety is prioritized, an all-position reading mode in which information of all cartridges is updated can be set by selecting "all check (all check mode)." When the productivity is to be prioritized, a changed-position reading mode in which only information of changed cartridges is updated can be set by selecting "changed position check" to minimize the updating time, thereby improving productivity of the medicine dispenser, and the medication assistance device. In FIG. 22, for administration timing, noon is abbreviated as "N," evening is abbreviated as "E," bedtime is abbreviated as "B," and morning is abbreviated as "M."

Figure 23:
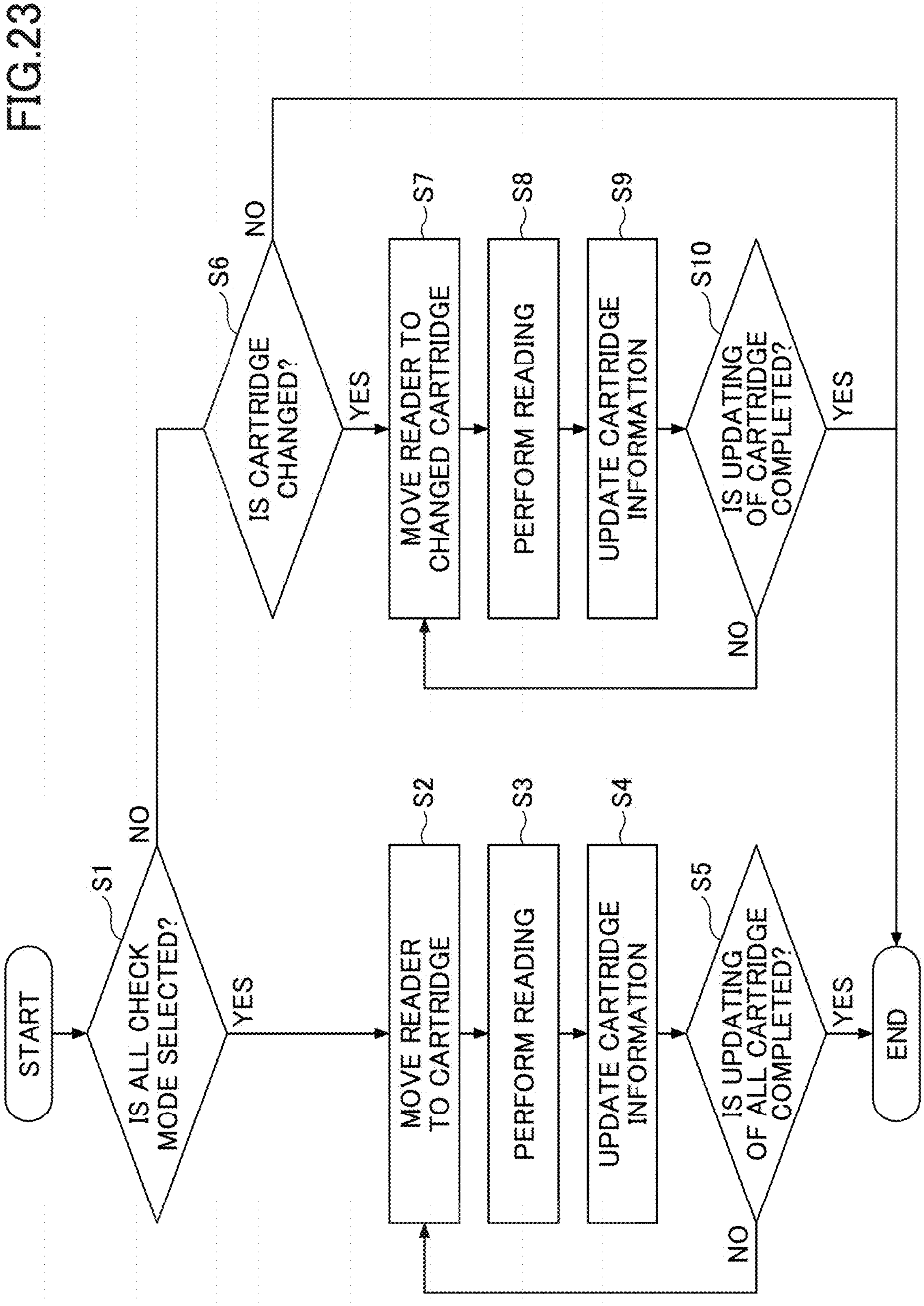
FIG. 23 is a control-flowchart of reading judgement according to one embodiment.

A control flow of reading judgement performed by the medication associated information reader (upper QR code reader 66) described in the above embodiment will be described with reference to FIG. 23.

First, whether or not the all check mode is selected is confirmed (step S1). If the all check mode is selected, the process proceeds to a step S2, and the carriage 50 on which the upper QR code reader 66 including the upper reader 66*a* is mounted is moved to the front cartridge. After moving, reading is performed by the upper reader 66*a*, and the cartridge information is updated. If there are cartridges that have not been read, the carriage 50 is moved to the subsequent cartridge, and the above operation is repeatedly performed until information of all cartridges is updated (step S5).

If the all check mode has not been selected in the step S1, whether there is any change in the cartridges is confirmed (step S6). If there is no change, the updating process of information of the cartridges is ended. In a case where the all check mode is not selected and there is a change in cartridges, the process proceeds to a step S7, the carriage 50 is moved to the position of the changed cartridge, reading is performed by the upper reader 66*a*, and the cartridge information is updated (step S8 to step S9). The above operation is performed on all of the changed cartridges, then the process is completed (step S10).

As described above, the information updating process is performed only on the changed cartridges so that safety can be assured while minimizing the reading operation for each process.

Figure 15:
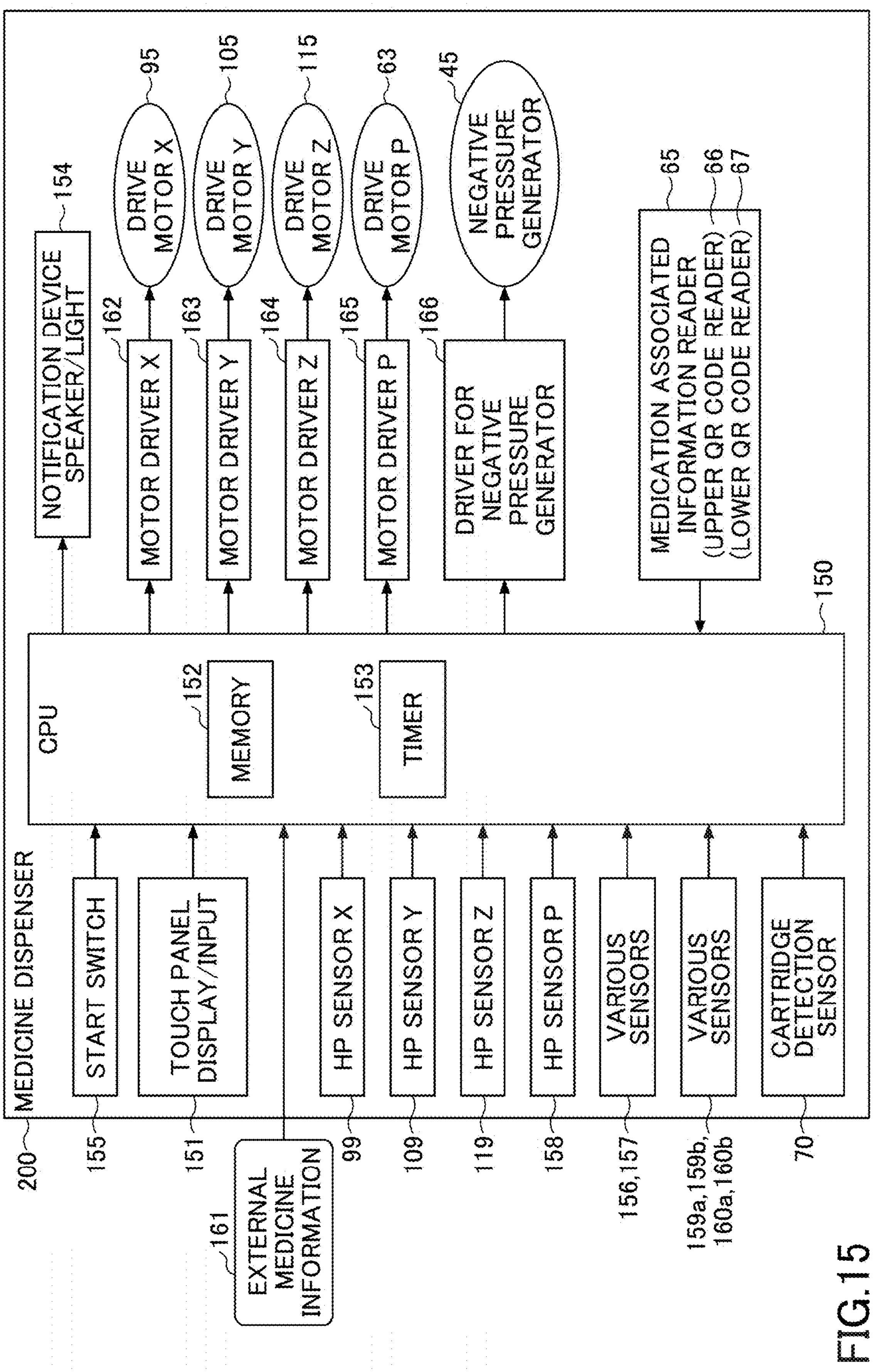
FIG. 15 is a control block diagram illustrating an example of a main control configuration of a medicine dispenser.
Figure 16:
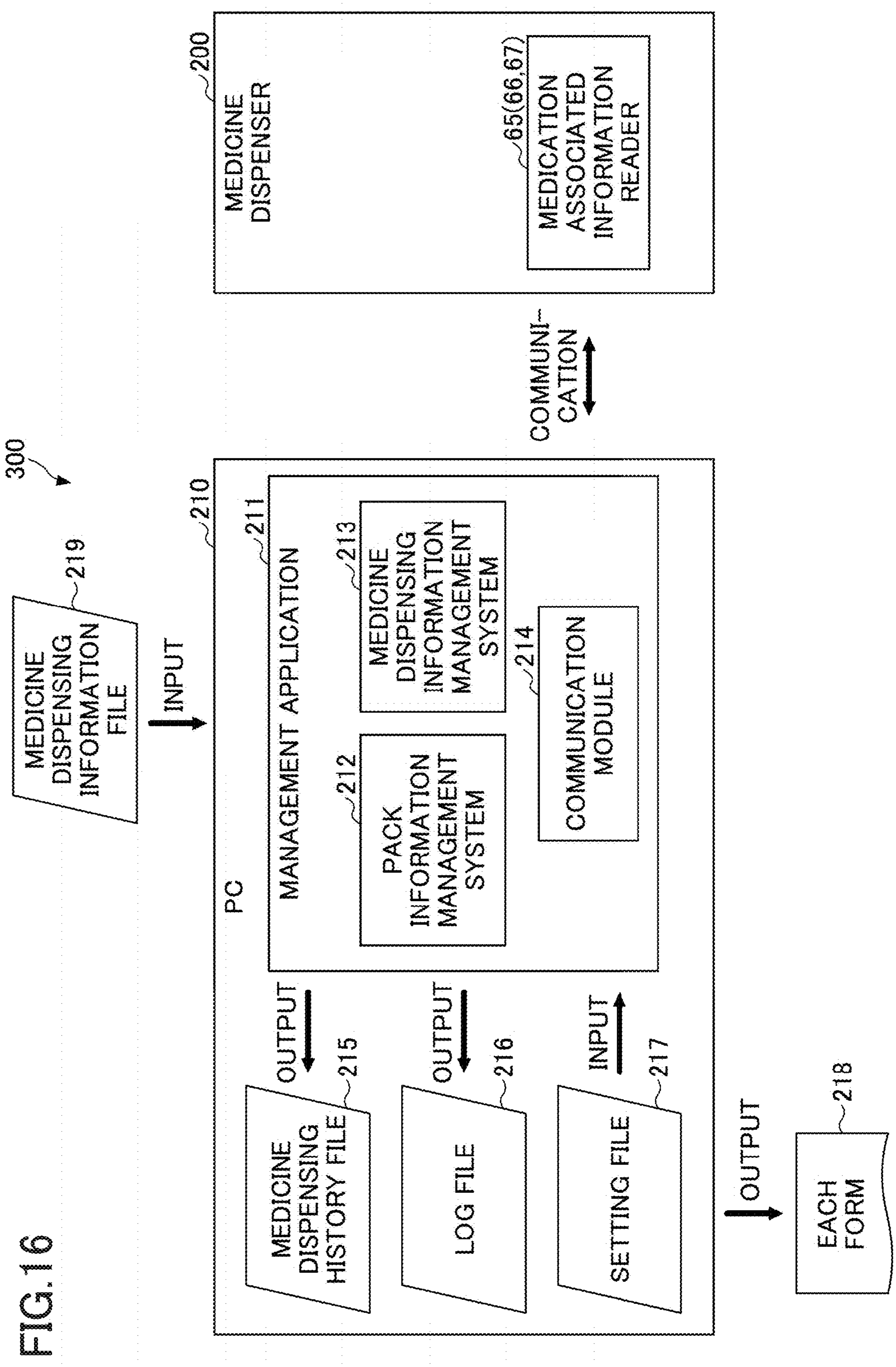
FIG. 16 is a control block diagram illustrating an example of a control configuration associated with a medication assistance device.

As in the embodiment described above, the CPU of the control unit 150 disposed in the medicine dispenser 200 has a function of controlling the discharge and transport mechanism (including the carriage 50 and the transporting device 90) to send a specific medicine pack 2 to a specific position (section 33 or compartment box 34) in the medicine dispensing tray 30 so as to match the medication associated information with the second medication associated information stored in the pack information memory (memory 170) after comparing the medication associated information 6*a* to 6*c* read by the pack information reader (the upper QR code reader 66 and the lower QR code reader 67 of the medication associated information reader 65) (see the control configuration of particularly FIGS. 15 and 16).

The above embodiments and examples may substantially include the following embodiments and effects.

A first embodiment is directed to a medication assistance device (e.g., the medication assistance device 300). The first embodiment includes a storing member (e.g., the cartridge 10) configured to store medicine packs, a medicine dispenser (e.g., medicine dispensing tray 30) configured to arrange a predetermined medicine pack in a predetermined position, a discharge and transport mechanism (e.g., the carriage 50 and the transporting device 90) configured to discharge the predetermined medicine pack from the storing member to transport to a predetermined position of the medicine dispenser, a pack information reader (e.g., the medication associated information reader 65) disposed in the discharge and transport mechanism, and configured to read medication associated information (e.g., medication associated information c) attached to at least one of the storing member or the medicine pack, where the medication associated information includes a name of an individual taking medication and administration timing, a pack information management system (e.g., the pack information management system 212) configured to manage the medication associated information of the medicine packs, a storing detector (e.g., the cartridge detection sensor 70) configured to detect attachment or detachment of the storing member to a device main body (e.g., the main body frame 199), and a controller (e.g., the control unit 150) configured to inform the pack information management system and causes the pack information reader to read the medication associated information of the storing member to be updated based on a detection signal from the storing detector at a time when the storing member is mounted in the device main body.

According to the first embodiment having the above configuration, if attachment or detachment of the storing member occurs, which may indicate that medicines in the set (loaded) medicine packs are possibly changed, erroneous dispensing of medication can be inhibited with the minimum reading operation of the pack information reader by updating information of the mounted and set medicine pack at a pin-point.

A second embodiment is directed to the first embodiment in which the storing detector includes an optical sensor, a distance sensor, a weight sensor, or a push button switch.

According to the second embodiment having the above configuration, attachment or detachment (replacement) of the storing member can be detected by the optical sensor, the distance sensor, the weight sensor, or the push button switch.

A third embodiment is directed to the first or second embodiment in which the medication assistance device includes a plurality of storing members as the storing member and a plurality of storing detectors as the storing detector, and each of the storing detectors is arranged for a corresponding storing member.

According to the third embodiment having the above configuration, the storing detector is disposed for each storing member. Therefore, only the storing member where a change is made can be read so that a minimum reading operation can be performed.

A fourth embodiment is directed to the first or second embodiment in which the medication assistance device includes a plurality of storing members as the storing member, where the plurality of the storing members form a storing member assembly that is an integrated structure of the plurality of storing members, where the storing member assembly is detachably mounted to the device main body, and the storing detector is configured to detect an attachment or detachment state of the storing member assembly.

According to the fourth embodiment having the above configuration, a plurality of storing members can be detected collectively as the storing member assembly, thus the number of storing detectors used can be reduced.

A fifth embodiment is directed to the first or second embodiment in which the pack information management system includes a changed-position reading mode and an all-position reading mode. The changed-position reading mode is a mode in which an operation of reading of the medication associated information is performed by the pack information reader only on the storing members whose attachment or detachment are detected by the storing detector. The all-position reading mode is a mode in which the operation is performed on all of the storing members regardless of the detection of attachment or detachment by the storing detector.

According to the fifth embodiment having the above configuration, there are changed-position reading mode in which only the changed positions are read to minimum the number of the operations of reading the medication associated information of the storing member can be reduced, and the all-position reading mode in which the medication associated information of all storing members is read for prioritizing the safety. A user can select the mode as appropriate.

A sixth embodiment is directed to any one of the first to fifth embodiment in which the discharge and transport mechanism includes a discharger (e.g., the carriage 50) configured to take the predetermined medicine pack out from the storing member, and a transporting mechanism (e.g., transporting device 90) configured to transport the predetermined medicine pack, which is taken out from the storing member, to the predetermined position of the medicine dispenser.

A seventh embodiment is directed to any one of the first to sixth embodiment in which the storing member is configured to store the medicine packs in a stacked state, and the medicine packs include unit-dose medicine packs (e.g., the unit-dose medicine packs 2) in each of which a single dose of one or more medicines is packaged, and a unit-dose medicine pack bundle (e.g., the pack bundle 2A) in which a plurality of the unit-dose medicine packs are stacked and bundled in a stacking direction.

A eighth embodiment is directed to any one of the first to the seventh embodiments in which the device main body includes a storage support member (e.g., the cartridge tray 20) configured to detachably support the storing member, and the storing detector is arranged at the storage support member.

According to the present disclosure, a medication assistance device, which can improve efficiency of medicine dispensing operations while maintaining safety with the minimum check, can be provided.

Although the preferred embodiments of the present disclosure have been described above, the present disclosure is not limited to specific embodiments, and various modifications and changes can be made within the scope of the gist of the present disclosure described in the claims, unless otherwise specified in the above description. For example, the technical features described in the above embodiments or examples may be appropriately combined.

The effects of the embodiments of the present disclosure described as appropriate are merely a list of the most suitable effects obtainable by the present disclosure. The effects obtainable by the present disclosure are not limited to the described effects of the embodiments of the present disclosure.

What is claimed is:

1. A medication assistance device comprising:

a storage member configured to store medicine packs;

a medicine dispenser configured to arrange a desired medicine pack among the medicine packs in a predetermined desired position;

a discharge and transport mechanism configured to discharge the desired medicine pack from the storage member to transport to the desired position of the medicine dispenser;

a pack information reader included in the discharge and transport mechanism, the pack information reader configured to read medication associated information attached to at least one of the storage member or the medicine pack, the medication associated information including a name of an individual taking medication and administration timing;

a pack information management system configured to manage the medication associated information of the medicine pack;

a storage detector configured to detect attachment or detachment of the storage member to a device main body; and a controller configured to inform the pack information management system and cause the pack information reader to read the medication associated information of the storage member to be updated based on a detection signal from the storage detector at a time when the storage member is mounted in the device main body, wherein the medication assistance device includes a plurality of storage members as the storage member, and the pack information management system includes a changed-position reading mode and an all-position reading mode, the changed-position reading mode being a mode in which an operation of reading the medication associated information is performed by the pack information reader only on one or more storage members among the plurality of storage members whose attachment or detachment are detected by the storage detector, and the all-position reading mode being a mode in which the operation is performed on all of the plurality of storage members regardless of the detection of attachment or detachment of the plurality of storage members.

2. The medication assistance device according to claim 1, wherein the storage detector includes an optical sensor, a distance sensor, a weight sensor, a push button switch, or any combinations thereof.

3. The medication assistance device according to claim 1, wherein the medication assistance device includes a plurality of storage detectors as the storage detector, and each of the plurality of storage detectors is corresponds to a storage member of the plurality of storage members.

4. The medication assistance device according to claim 1, wherein the plurality of storage members form a storage member assembly that is an integrated structure of the plurality of storage members, and the storage member assembly is detachably mounted to the device main body, and the storage detector is configured to detect an attachment or detachment state of the storage member assembly.

5. The medication assistance device according to claim 1, wherein the discharge and transport mechanism includes:

a discharger configured to take the desired medicine pack out of the storage member, and a transporting mechanism configured to transport the desired medicine pack, which is taken out of the storage member, to the desired position of the medicine dispenser.

6. The medication assistance device according to claim 1, wherein the storage member is configured to store the medicine packs in a stacked state, and the medicine packs include unit-dose medicine packs in each of which a single dose of one or more medicines is packaged, and a unit-dose medicine pack bundle in which a plurality of unit-dose medicine packs are stacked and bundled in a stacking direction.

7. The medication assistance device according to claim 1, further comprising:

a display configured to indicate the attachment or detachment of each storage member of the plurality of storage members to the device main body.

8. The medication assistance device according to claim 7, wherein the plurality of storage members form a storage member assembly that is an integrated structure of the plurality of storage members, and the display includes a plurality of lighting elements, each of the plurality of lighting elements corresponding to a position within the storage member assembly.

9. The medication assistance device according to claim 1, wherein the medication associated information is included on a QR code tag, a barcode tag, or a RFID tag.

10. The medication assistance device according to claim 1, wherein the pack information reader is a plurality of pack information readers, the plurality of pack information readers including a first pack information reader and a second pack information reader, the first pack information reader configured to read the medication associated information on the medicine pack, and the second pack information reader configured to read the medication associated information on the storage member.

11. A medication assistance device comprising:

a storage member configured to store medicine packs;

a medicine dispenser configured to arrange a desired medicine pack among the medicine packs in a desired position;

a discharge and transport mechanism configured to discharge the desired medicine pack from the storage member to transport to the desired position of the medicine dispenser;

a pack information reader included in the discharge and transport mechanism, the pack information reader configured to read medication associated information attached to at least one of the storage member or the medicine pack, the medication associated information including a name of an individual taking medication and administration timing;

a pack information management system configured to manage the medication associated information of the medicine pack;

a storage detector configured to detect attachment or detachment of the storage member to a device main body; and a controller configured to inform the pack information management system and cause the pack information reader to read the medication associated information of the storage member to be updated based on a detection signal from the storage detector at a time when the storage member is mounted in the device main body, wherein the device main body includes a storage support member configured to detachably support the storage member, and the storage detector is on the storage support member.

12. The medication assistance device according to claim 1, wherein the device main body includes a storage support member configured to detachably support the storage member, and the storage detector is on the storage support member.

13. The medication assistance device according to claim 11, wherein the storage detector includes an optical sensor, a distance sensor, a weight sensor, a push button switch, or any combinations thereof.

14. The medication assistance device according to claim 11, wherein the medication assistance device includes a plurality of storage detectors as the storage detector, and each of the plurality of storage detectors corresponds to a respective storage member of the plurality of storage members.

15. The medication assistance device according to claim 11, wherein the medication assistance device includes a plurality of storage members as the storage member, the plurality of storage members form a storage member assembly that is an integrated structure of the plurality of storage members, and the storage member assembly is detachably mounted to the device main body, and the storage detector is configured to detect an attachment or detachment state of the storage member assembly.

16. The medication assistance device according to claim 11, wherein the discharge and transport mechanism includes:

a discharger configured to take the desired medicine pack out of the storage member, and a transporting mechanism configured to transport the desired medicine pack, which is taken out of the storage member, to the desired position of the medicine dispenser.

17. The medication assistance device according to claim 11, wherein the storage member is configured to store the medicine packs in a stacked state, and the medicine packs include unit-dose medicine packs in each of which a single dose of one or more medicines is packaged, and a unit-dose medicine pack bundle in which a plurality of unit-dose medicine packs are stacked and bundled in a stacking direction.

18. The medication assistance device according to claim 11, wherein the medication assistance device includes a plurality of storage members as the storage member, and the medication assistance device further includes a display configured to indicate the attachment or detachment of each storage member of the plurality of storage members to the device main body.

19. The medication assistance device according to claim 18, wherein the plurality of storage members form a storage member assembly that is an integrated structure of the plurality of storage members, and the display includes a plurality of lighting elements, each of the plurality of lighting elements corresponding to a position within the storage member assembly.

20. The medication assistance device according to claim 11, wherein the medication associated information is included on a QR code tag, a barcode tag, or a RFID tag.

* * * * *